US011849488B2

(12) United States Patent
Taherzadeh Boroujeni et al.

(10) Patent No.: US 11,849,488 B2
(45) Date of Patent: Dec. 19, 2023

(54) RANDOM ACCESS VIA AN ALTERNATIVE FREQUENCY RESOURCE

(71) Applicant: QUALCOMM Incorporated, San Diego, CA (US)

(72) Inventors: Mahmoud Taherzadeh Boroujeni, San Diego, CA (US); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 17/318,879

(22) Filed: May 12, 2021

(65) Prior Publication Data

US 2021/0385880 A1    Dec. 9, 2021

Related U.S. Application Data

(60) Provisional application No. 63/035,565, filed on Jun. 5, 2020.

(51) Int. Cl.
*H04W 74/08* (2009.01)
*H04L 27/26* (2006.01)
*H04W 72/0453* (2023.01)
*H04W 24/08* (2009.01)

(52) U.S. Cl.
CPC ... *H04W 74/0841* (2013.01); *H04L 27/26025* (2021.01); *H04W 24/08* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 2019/0215877 A1* | 7/2019 | Qian | H04L 27/2666 |
| 2020/0068619 A1* | 2/2020 | Kim | H04W 74/004 |
| 2020/0068620 A1* | 2/2020 | Kim | H04W 74/006 |
| 2020/0186308 A1* | 6/2020 | Yan | H04L 5/00 |
| 2020/0351801 A1* | 11/2020 | Jeon | H04W 52/48 |
| 2021/0307108 A1* | 9/2021 | Babaei | H04L 1/189 |
| 2022/0086919 A1* | 3/2022 | Hofström | H04W 72/542 |
| 2022/0408372 A1* | 12/2022 | Feuersaenger | H04L 5/0064 |

* cited by examiner

*Primary Examiner* — Rebecca E Song
(74) *Attorney, Agent, or Firm* — Arun Swain

(57) ABSTRACT

Methods, systems, and devices for wireless communications are described. A user equipment (UE) may transmit a first-attempt random access preamble to a base station via a first frequency resource. The first frequency resource may be within a first bandwidth part (BWP), a first component carrier (CC), a first frequency subband, or any combination thereof. If the UE fails to detect a random access response (RAR) for the first-attempt random access preamble within the time period, the UE may transmit a second-attempt random access preamble to the base station. In some examples, the UE may transmit the second-attempt random access preamble via a different, second frequency resource, which may be within a second BWP, a second CC, a second frequency subband, or any combination thereof. The base station may transmit an indication of the second frequency resource to the UE.

26 Claims, 16 Drawing Sheets

RANDOM ACCESS VIA AN ALTERNATIVE FREQUENCY RESOURCE

CROSS REFERENCE

The present Application for Patent claims the benefit of U.S. Provisional Patent Application No. 63/035,565 by TAHERZADEH BOROUJENI et al., entitled "RANDOM ACCESS VIA AN ALTERNATIVE FREQUENCY RESOURCE" and filed Jun. 5, 2020, which is assigned to the assignee hereof and expressly incorporated by reference herein.

FIELD OF TECHNOLOGY

The following relates generally to wireless communications and more specifically to random access via an alternative frequency resource.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support random access via an alternative frequency resource. Generally, the described techniques provide for a user equipment (UE) to transmit an additional (e.g., second-attempt) random access preamble to a base station using an alternative frequency resource relative to a frequency resource used for a previously transmitted (e.g., first or initial attempt) random access preamble. For example, a UE may transmit a first random access preamble to a base station via a first frequency resource, which may be within a first bandwidth part (BWP), a first component carrier (CC), a first frequency subband, or any combination thereof. The UE may monitor for a random access response (RAR) from the base station for a time period (e.g., a RAR window) after transmitting the first random access preamble.

In some cases, the UE may not detect any RAR for the first random access preamble (e.g., responsive thereto) within the time period. For example, the base station may not have properly received or decoded the first random access preamble (e.g., due to physical distance from the UE or other channel conditions). Based on not detecting a RAR for the first random access preamble, the UE may transmit a second random access preamble to the base station via a second, different frequency resource, which may be within a different BWP, a different CC, a different frequency subband, or any combination thereof relative to the first frequency resource. The base station may monitor the first frequency resource for first (e.g., initial-attempt) random access preambles and the second frequency for second (e.g., second-attempt) random access preambles, including the second random access preamble from the UE. In some cases, the base station may transmit an indication of the second frequency resource to the UE (e.g., as part of system information or another broadcast transmission, which thus may in some cases be received by the UE prior to the UE transmitting the first random access preamble). The base station may receive the second random access preamble from the UE based on monitoring the second frequency resource.

A method for wireless communications at a user equipment (UE) is described. The method may include transmitting, to a base station, a first-attempt random access preamble via a first frequency resource, monitoring, for a time period after transmitting the first-attempt random access preamble, for a random access response corresponding to the first-attempt random access preamble, identifying, based on the monitoring, a failure to detect the random access response within the time period, and transmitting, to the base station and based on the failure to detect the random access response, a second-attempt random access preamble via a second frequency resource different from the first frequency resource.

An apparatus for wireless communications at a UE is described. The apparatus may include a processor, memory coupled with the processor, and instructions stored in the memory and operable, when executed by the processor, to cause the apparatus to transmit, to a base station, a first-attempt random access preamble via a first frequency resource, monitor, for a time period after transmitting the first-attempt random access preamble, for a random access response corresponding to the first-attempt random access preamble, identify, based on the monitoring, a failure to detect the random access response within the time period, and transmit, to the base station and based on the failure to detect the random access response, a second-attempt random access preamble via a second frequency resource different from the first frequency resource.

Another apparatus for wireless communications at a UE is described. The apparatus may include means for transmitting, to a base station, a first-attempt random access preamble via a first frequency resource, means for monitoring, for a time period after transmitting the first-attempt random access preamble, for a random access response corresponding to the first-attempt random access preamble, means for identifying, based on the monitoring, a failure to detect the random access response within the time period, and means for transmitting, to the base station and based on the failure to detect the random access response, a second-attempt random access preamble via a second frequency resource different from the first frequency resource.

A non-transitory computer-readable medium storing code for wireless communications at a UE is described. The code may include instructions executable by a processor to transmit, to a base station, a first-attempt random access preamble via a first frequency resource, monitor, for a time period after transmitting the first-attempt random access preamble, for a random access response corresponding to the first-attempt random access preamble, identify, based on the monitoring, a failure to detect the random access response within the time period, and transmit, to the base station and based on the failure to detect the random access response, a second-attempt random access preamble via a second frequency resource different from the first frequency resource.

In some examples of the method, apparatuses, and non-transitory computer-readable medium described herein, the first frequency resource may be within a first bandwidth part, a first component carrier, a first frequency subband, or any combination thereof and the second frequency resource may be within a second bandwidth part different from the first bandwidth part, a second component carrier different from the second component carrier, a second frequency subband different from the first component carrier, or any combination thereof.

In some examples of the method, apparatuses, and non-transitory computer-readable medium described herein, transmitting the first-attempt random access preamble via the first frequency resource may include operations, features, means, or instructions for transmitting the first-attempt random access preamble using a first subcarrier spacing and transmitting the second-attempt random access preamble via the second frequency resource may include operations, features, means, or instructions for transmitting the second-attempt random access preamble using a second subcarrier spacing that may be different from the first subcarrier spacing.

In some examples of the method, apparatuses, and non-transitory computer-readable medium described herein, the second subcarrier spacing may be smaller than the first subcarrier spacing.

some examples of the method, apparatuses, and non-transitory computer-readable medium described herein may further include operations, features, means, or instructions for transmitting the first-attempt random access preamble via the first frequency resource includes transmitting the first-attempt random access preamble using a first symbol duration and transmitting the second-attempt random access preamble via the second frequency resource includes transmitting the second-attempt random access preamble using a second symbol duration that may be longer than the first symbol duration.

some examples of the method, apparatuses, and non-transitory computer-readable medium described herein may further include operations, features, means, or instructions for transmitting the first-attempt random access preamble via the first frequency resource includes transmitting the first-attempt random access preamble according to a first preamble format and transmitting the second-attempt random access preamble via the second frequency resource includes transmitting the second-attempt random access preamble according to a second preamble format that may be different than the first preamble format.

some examples of the method, apparatuses, and non-transitory computer-readable medium described herein may further include operations, features, means, or instructions for transmitting the first-attempt random access preamble via the first frequency resource includes transmitting the first-attempt random access preamble according to a first preamble format and transmitting the second-attempt random access preamble via the second frequency resource includes transmitting the second-attempt random access preamble according to a second preamble format that may be different than the first preamble format.

some examples of the method, apparatuses, and non-transitory computer-readable medium described herein may further include operations, features, means, or instructions for transmitting the first-attempt random access preamble via the first frequency resource includes transmitting the first-attempt random access preamble according to a preamble format and transmitting the second-attempt random access preamble via the second frequency resource includes transmitting the second-attempt random access preamble according to the preamble format.

Some examples of the method, apparatuses, and non-transitory computer-readable medium described herein may further include operations, features, means, or instructions for monitoring, for a second time period after transmitting the second-attempt random access preamble, for a second random access response corresponding to the second-attempt random access preamble.

some examples of the method, apparatuses, and non-transitory computer-readable medium described herein may further include operations, features, means, or instructions for monitoring for the second random access response includes monitoring the first frequency resource.

some examples of the method, apparatuses, and non-transitory computer-readable medium described herein may further include operations, features, means, or instructions for monitoring for the second random access response includes monitoring the second frequency resource.

Some examples of the method, apparatuses, and non-transitory computer-readable medium described herein may further include operations, features, means, or instructions for receiving, from the base station, an indication of a frequency resource to monitor for the second random access response, where monitoring for the second random access response may be based on the indication.

Some examples of the method, apparatuses, and non-transitory computer-readable medium described herein may further include operations, features, means, or instructions for receiving, from the base station, an indication of the first frequency resource and an indication of the second frequency resource.

In some examples of the method, apparatuses, and non-transitory computer-readable medium described herein, receiving the indication of the second frequency resource may include operations, features, means, or instructions for receiving system information that includes the indication of the second frequency resource.

In some examples of the method, apparatuses, and non-transitory computer-readable medium described herein, the system information includes remaining minimum system information (RMSI) that includes the indication of the second frequency resource.

Some examples of the method, apparatuses, and non-transitory computer-readable medium described herein may further include operations, features, means, or instructions for receiving, from the base station, a synchronization signal prior to transmitting the first-attempt random access preamble, performing one or more signal quality measurements on the synchronization signal, and determining that the one or more signal quality measurements satisfy a threshold, where transmitting the second-attempt random access preamble via the second frequency resource may be based on determining that the one or more signal quality measurements satisfy the threshold.

some examples of the method, apparatuses, and non-transitory computer-readable medium described herein may further include operations, features, means, or instructions for receiving the synchronization signal includes receiving a synchronization signal block (SSB) that includes the synchronization signal, the one or more signal quality measurements include a reference signal received power for the synchronization signal, and determining that the one or more signal quality measurements satisfy the threshold includes determining that the reference signal received power may be below the threshold.

A method for wireless communications at a base station is described. The method may include transmitting an indication of a first frequency resource for first-attempt random access preambles and an indication of a second frequency resource for second-attempt random access preambles, the second frequency resource different from the first frequency resource, where each second-attempt random access preamble is associated with a prior respective first-attempt random access preamble, monitoring the first frequency resource for the first-attempt random access preambles, monitoring the second frequency resource for the second-attempt random access preambles, and receiving, based on monitoring the second frequency resource, a second-attempt random access preamble from a UE via the second frequency resource.

An apparatus for wireless communications at a base station is described. The apparatus may include a processor, memory coupled with the processor, and instructions stored in the memory and operable, when executed by the processor, to cause the apparatus to transmit an indication of a first frequency resource for first-attempt random access preambles and an indication of a second frequency resource for second-attempt random access preambles, the second frequency resource different from the first frequency resource, where each second-attempt random access preamble is associated with a prior respective first-attempt random access preamble, monitor the first frequency resource for the first-attempt random access preambles, monitor the second frequency resource for the second-attempt random access preambles, and receive, based on monitoring the second frequency resource, a second-attempt random access preamble from a UE via the second frequency resource.

Another apparatus for wireless communications at a base station is described. The apparatus may include means for transmitting an indication of a first frequency resource for first-attempt random access preambles and an indication of a second frequency resource for second-attempt random access preambles, the second frequency resource different from the first frequency resource, where each second-attempt random access preamble is associated with a prior respective first-attempt random access preamble, means for monitoring the first frequency resource for the first-attempt random access preambles, means for monitoring the second frequency resource for the second-attempt random access preambles, and means for receiving, based on monitoring the second frequency resource, a second-attempt random access preamble from a UE via the second frequency resource.

A non-transitory computer-readable medium storing code for wireless communications at a base station is described. The code may include instructions executable by a processor to transmit an indication of a first frequency resource for first-attempt random access preambles and an indication of a second frequency resource for second-attempt random access preambles, the second frequency resource different from the first frequency resource, where each second-attempt random access preamble is associated with a prior respective first-attempt random access preamble, monitor the first frequency resource for the first-attempt random access preambles, monitor the second frequency resource for the second-attempt random access preambles, and receive, based on monitoring the second frequency resource, a second-attempt random access preamble from a UE via the second frequency resource.

In some examples of the method, apparatuses, and non-transitory computer-readable medium described herein, the first frequency resource may be within a first bandwidth part, a first component carrier, a first frequency subband, or any combination thereof and the second frequency resource may be within a second bandwidth part different from the first bandwidth part, a second component carrier different from the second component carrier, a second frequency subband different from the first component carrier, or any combination thereof.

In some examples of the method, apparatuses, and non-transitory computer-readable medium described herein, transmitting the indication of the first frequency resource and the indication of the second frequency resource may include operations, features, means, or instructions for broadcasting the indication of the first frequency resource and the indication of the second frequency resource.

In some examples of the method, apparatuses, and non-transitory computer-readable medium described herein, transmitting the indication of the first frequency resource and the indication of the second frequency resource may include operations, features, means, or instructions for transmitting system information for a cell associated with the base station, the system information including the indication of the first frequency resource and the indication of the second frequency resource.

In some examples of the method, apparatuses, and non-transitory computer-readable medium described herein, the first frequency resource may have a first subcarrier spacing and the second frequency resource may have a second subcarrier spacing that may be different from the first subcarrier spacing.

In some examples of the method, apparatuses, and non-transitory computer-readable medium described herein, the second subcarrier spacing may be smaller than the first subcarrier spacing.

In some examples of the method, apparatuses, and non-transitory computer-readable medium described herein, each of the second-attempt random access preambles may have a different preamble format than a respective first-attempt random access preamble.

In some examples of the method, apparatuses, and non-transitory computer-readable medium described herein, each of the second-attempt random access preambles may have a same preamble format as a respective first-attempt random access preamble.

Some examples of the method, apparatuses, and non-transitory computer-readable medium described herein may further include operations, features, means, or instructions for transmitting, to the UE in response to the second-attempt random access preambles, a random access response via the first frequency resource.

Some examples of the method, apparatuses, and non-transitory computer-readable medium described herein may further include operations, features, means, or instructions for transmitting, to the UE in response to the second-attempt random access preambles, a random access response via the second frequency resource.

Some examples of the method, apparatuses, and non-transitory computer-readable medium described herein may further include operations, features, means, or instructions for transmitting a synchronization signal, where, the second frequency resource may be for the second-attempt random access preambles from one or more UEs when, for the one or more UEs, a signal quality of the synchronization signal may be below a signal quality threshold, and the first frequency resource may be for the second-attempt random access preambles from the one or more UEs when, for the one or more UEs, the signal quality of the synchronization signal satisfies the signal quality threshold.

DETAILED DESCRIPTION

Figure 1:
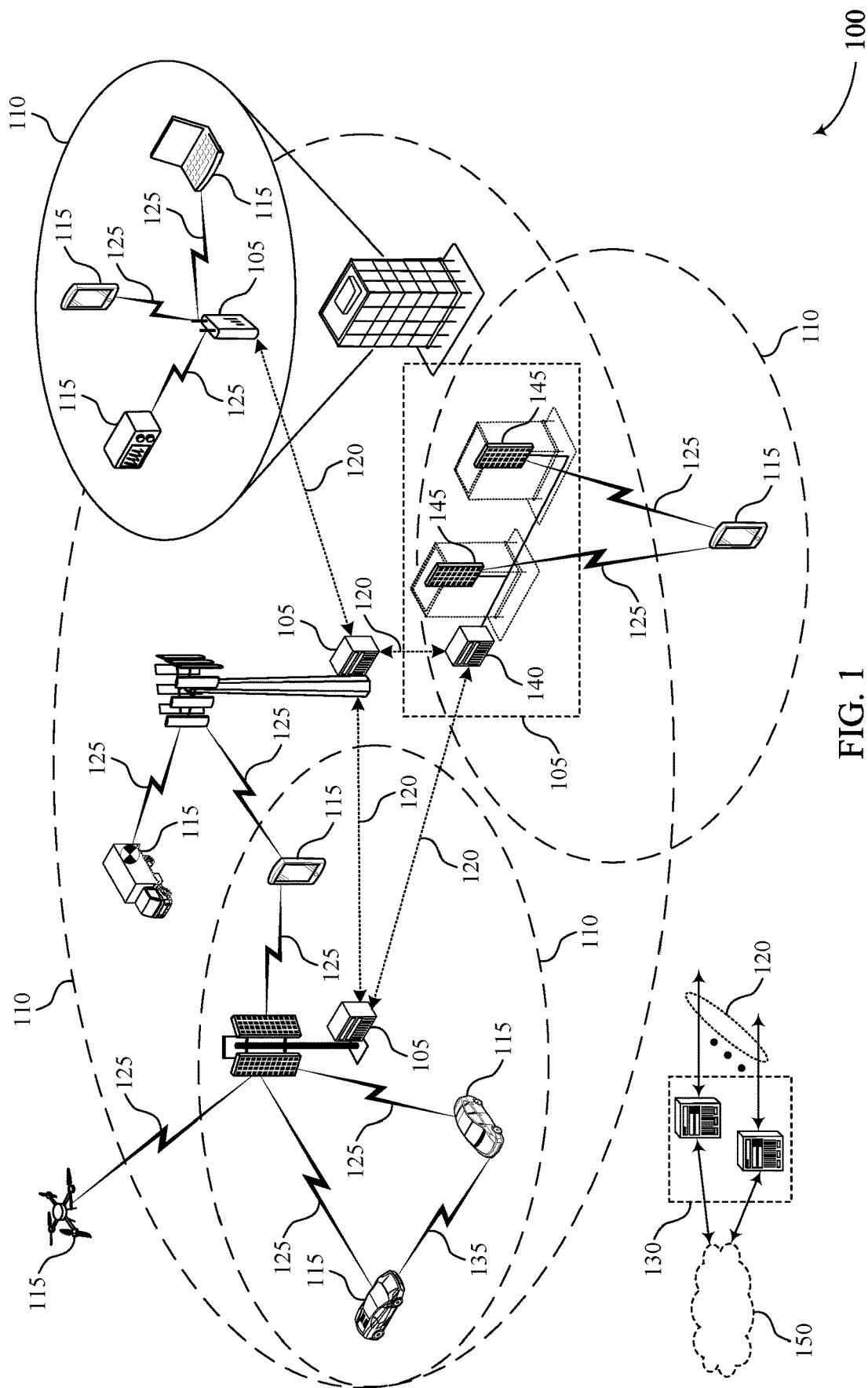
FIGS. 1 and 2 illustrate examples of wireless communications systems that support random access via an alternative frequency resource in accordance with aspects of the present disclosure.

In some examples, a user equipment (UE) may perform a random access procedure with a base station. For example, the UE may receive one or more broadcast signals from the base station, such as a synchronization signal (e.g., within a synchronization signal block (SSB)), a system information block (SIB), or the like. Based on information received in the one or more broadcasted signals, the UE may send a first message (msg1) of the random access procedure, which may include a random access preamble. The UE may send the random access preamble via a physical random access channel (PRACH), and thus in some cases the random access preamble may be referred to as a PRACH preamble or alternatively as a PRACH for short.

In some cases, the base station may detect the msg1 and send a second message (msg2) of the random access procedure that acknowledges the reception of the msg1. The second message of the random access procedure may be referred to as a random access response (RAR). In some cases, in response to the RAR, the UE may then send a third message (msg3) of the random access procedure (e.g., a message that includes a connection request), and the base station may send a fourth message (msg4) of the random access procedure in response to the third message (e.g., a message that resolves any contention-based aspects of the third message or otherwise completes the random access procedure).

In some cases, the base station may not receive a random access preamble that is transmitted by a UE. For example, the UE may be physically distant from the base station (e.g., at a cell edge) or otherwise have poor channel conditions with respect to the base station. Thus, the UE may transmit a second random access preamble if no random access response (RAR) is received by the UE within a RAR window (e.g., a time period after the random access preamble is sent). However, excessive transmissions (e.g., retransmissions) of random access preambles may cause an inefficient or excessive use of random access preamble resources (e.g., time and frequency resources).

As described herein, a UE may transmit an additional random access preamble (e.g., a second-attempt random access preamble) if no RAR is received within the RAR window, but the UE may transmit the additional random access preamble using a different, second frequency resource relative to a first frequency resource used by the UE to transmit the prior (e.g., initial, first-attempt) random access preamble. The second frequency resource may provide an enhanced robustness for transmitting the second random access preamble (e.g., an enhanced likelihood of receipt by the base station), which may decrease a likelihood of additional, subsequent random access preamble transmissions by the UE. For example, the second frequency resource may have a different (e.g., smaller) subcarrier spacing and thus support a different (e.g., larger) symbol duration relative to the first frequency resource.

For example, the UE may transmit an initial (e.g., first-attempt) random access preamble using a first frequency resource that includes or is within a first bandwidth part (BWP), a first component carrier (CC), a first frequency subband (e.g., where examples of a frequency subband may include a frequency range such as a frequency range 1 (FR1) and a frequency range 2 (FR2) within a new radio (NR) system), or any combination thereof. The base station may monitor the first frequency resource for random access preambles from UEs, including initial (e.g., first-attempt) random access preambles. The UE may monitor for the RAR (e.g., by monitoring the first frequency resource or an associated frequency resource for the RAR) corresponding to the initial random access preamble for a time period after sending the initial random access preamble. If the UE does not receive the RAR during the time period, the UE may transmit an additional (e.g., second-attempt) random access preamble using a different frequency resource, which may include or be within a different BWP, a different CC, a different frequency subband, or any combination thereof relative to the first frequency resource. The base station may monitor the second frequency resource for second-attempt random access preambles. The base station may receive the additional random access preamble and may transmit a RAR to the UE, with the RAR corresponding to the additional random access preamble transmitted over the first frequency resource, the second frequency resource, or some other frequency resource.

In some cases, the base station may transmit an indication of the second (e.g., alternative) frequency resource to be used for second-attempt random access preambles. For example, the base station may broadcast an indication of the first frequency resource, the second frequency resource, or both as part of system information for a cell. The base station thus may transmit such an indication periodically or on some other recurring basis, and thus may monitor for random access preambles on either frequency resource with any temporal relationship (e.g., before, concurrently, or after) with respect to transmitting such an indication. Additionally or alternatively, the base station may transmit an indication of the frequency resource (e.g., the first frequency resource or the second frequency resource) that the UE may monitor for a RAR corresponding to a second-attempt random access preamble. additionally or alternatively, use of the second frequency resource for a second-attempt random access preamble may in some cases be limited to UEs for which channel conditions are relatively poor (e.g., based on a signal quality of a synchronization signal or other reference signal being below a threshold), which may avoid collisions on the second frequency resource or otherwise further enhance the robustness of the second frequency resource with respect to second-attempt random access preamble transmissions.

Aspects of the disclosure are initially described in the context of wireless communications systems. Additional aspects of the disclosure are described with reference to a resource timeline and a process flow. Aspects of the disclosure are further illustrated by and described with reference to apparatus diagrams, system diagrams, and flowcharts that relate to random access via an alternative frequency resource.

FIG. 1 illustrates an example of a wireless communications system 100 that supports random access via an alternative frequency resource in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a quantity of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The quantity of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the quantity of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a quantity of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a quantity of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In some other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In some other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system.

In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a quantity of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured quantity of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other cases, the device may provide HARQ feedback in a subsequent slot, or according to some other time interval.

In some examples, a UE 115 may establish communications with a base station 105 by performing a random access procedure with the base station 105. For example, the UE 115 may receive one or more broadcast signals (e.g., an SSB and system information, such as one or more SIBs) from the base station 105. Based on information included in the one or more broadcast signals, the UE 115 may generate and transmit a random access preamble (e.g., a msg1 as part of the random access procedure). In some cases, if the base station 105 successfully receives and decodes the random access preamble, the base station 105 may transmit to the UE a second message that acknowledges reception of the random access preamble, which may be referred to as a msg2 or a RAR. In some cases, however, the base station 105 may not successfully receive or decode the random access preamble from the UE 115, and thus the base station 105 may not transmit a RAR in response to the random access preamble.

As described herein, wireless communications system 100 may support the use of techniques that enable a UE 115 to transmit an additional random access preamble if no RAR is received while efficiently using random access preamble resources. For example, the UE 115 may transmit a first (e.g., initial, first-attempt) random access preamble using a first frequency resource, which may within (e.g., included in) a first BWP, a first CC, a first frequency subband, or a combination thereof. The UE 115 may monitor for a RAR for the for random access preamble during a time period after sending the initial random access preamble. If the UE 115 does not receive the RAR during the time period, the UE 115 may transmit a second (e.g., follow-up, second-attempt) random access preamble using a second frequency resource that may be different that the first frequency resource. For example, the second frequency resource may be within a second BWP, a second CC, a second frequency subband, or any combination thereof. In some cases, the base station 105 may transmit an indication of the second frequency resource to the UE 115. The base station 105 may monitor both the first frequency resource and the second frequency resource for random access preambles, and the base station may transmit a RAR to the UE 115 in response to any random access preamble that the base station 105 receives.

Figure 2:
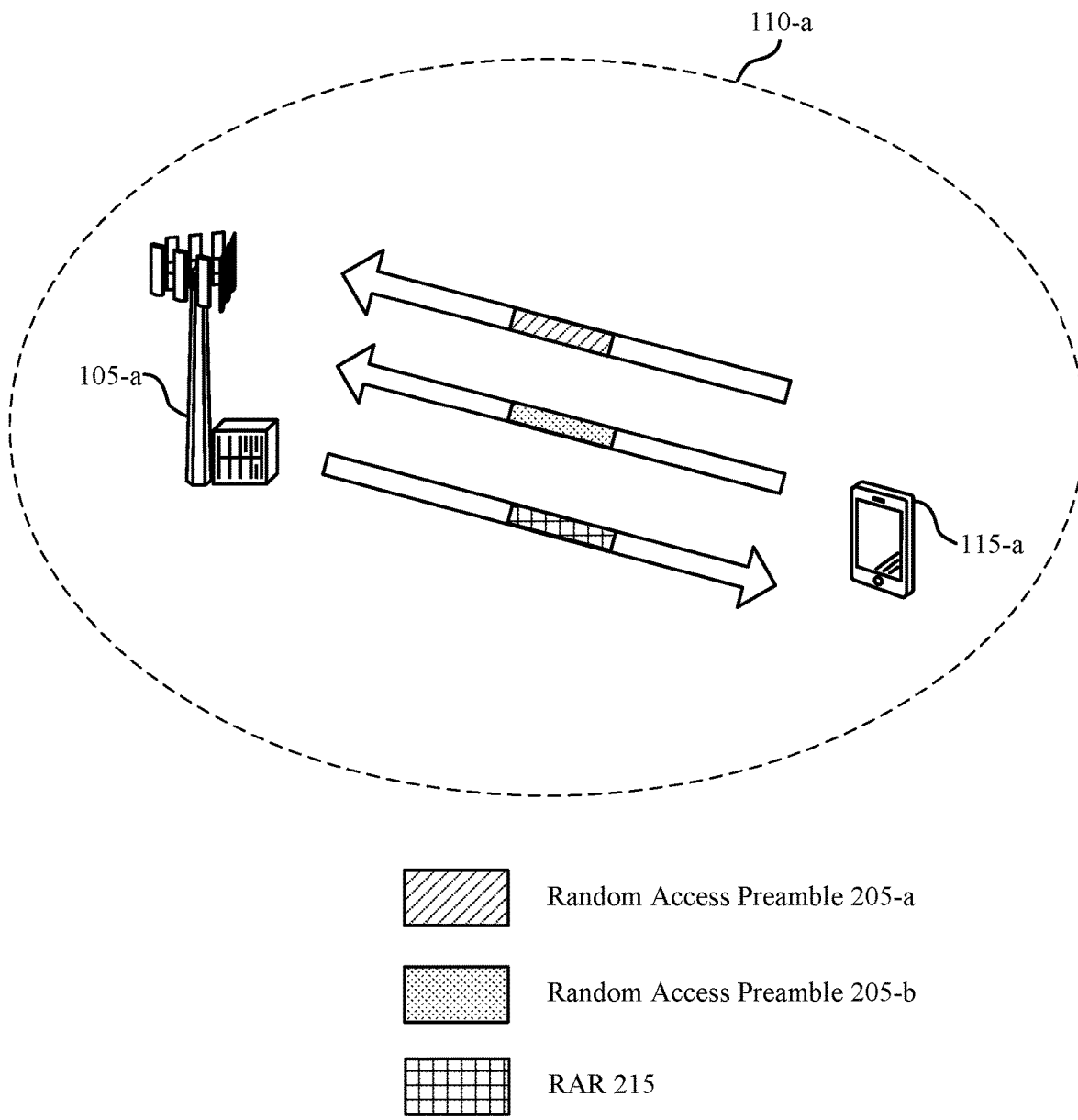

FIG. 2 illustrates an example of a wireless communications system 200 that supports random access via an alternative frequency resource in accordance with aspects of the present disclosure. In some examples, wireless communications system 200 may implement aspects of wireless communications system 100 and may include UE 115-a and base station 105-a, which may be examples of a UE 115 and a base station 105 as described with reference to FIG. 1. Base station 105-a may have coverage area 110-a.

In some examples, a UE 115 may perform a random access procedure to establish communications with a base station 105. For example, the UE 115 may receive one or more broadcast signals (e.g., an SSB, one or more SIB, or the like) from the base station 105. In some cases, a received SIB may be a type 1 SIB (SIB1). The SIB1 may include one or more access related parameters. Based on information included in the SSB and one or more SIBs (e.g., a SIB1), the UE 115 may send a msg1 to the base station 105. In some cases, the msg1 may be a random access preamble 205. In some cases, the base station 105 may detect the msg1 and send a msg2 of the four-step random access procedure to the UE 115. For example, the base station 105 may scramble a physical downlink control channel (PDCCH) transmission (e.g., a downlink control information (DCI) message) with a random access-radio network temporary identifier (RA-RNTI). The RA-RNTI may be a function of the random access occasion used to send the msg1. In some examples, the PDCCH transmission may point to (e.g., provide a grant for) a physical downlink shared channel (PDSCH) transmission, and the PDSCH transmission may include a MAC-control element (MAC-CE) that acknowledges the reception of the msg1. The PDCCH transmission, or the PDSCH transmission, or both collectively may be referred to as a RAR. The PDSCH transmission may also include an uplink grant from the base station 105 for the UE 115 to send a msg3 of the random access procedure to the base station 105, and the base station 105 may send a msg4 of the random access procedure to the UE 115.

In some cases, if no RAR 215 is received from the base station 105 during a RAR window (e.g., a time period after sending the msg1), the UE 115 may transmit another msg1. The duration of the RAR window may be specified as part of a SIB, for example. In some cases, the UE may transmit a subsequent (e.g., second) msg1 with power ramping, meaning with additional transmit power when compared with the prior msg1.

Additionally or alternatively, UE 115-a may transmit a second msg1 using an alternative frequency resource relative to the frequency resource used to transmit a first msg1. For example, UE 115-a may transmit a first random access preamble 205-a and, after not receiving any RAR to random access preamble 205-a, UE 115-a may transmit a second random access preamble 205-b as shown in FIG. 2. That is, the first random access preamble 205-a may be a first-attempt random access preamble 205. Similarly, the second random access preamble 205-b may be a second-attempt random access preamble 205. For example, UE 115-a may attempt to transmit the random access preambles 205, but base station 105-a may be unable to decode the random access preambles 205 or may fail to receive the random access preambles 205.

UE 115-a may transmit the first random access preamble 205-a via a first frequency resource and second random access preamble 205-b via a second, different frequency resource. For example, relative to the first frequency resource, the second frequency resource may be included within a different BWP, a different CC, or a different frequency subband. The second frequency resource may have one or more properties that enhance the likelihood of successful reception and decoding of second random access preamble 205-b (e.g., relative to the likelihood of successful reception and decoding of first random access preamble 205-a). For example, the second frequency resource may have a different (e.g., smaller) subcarrier spacing, thus second random access preamble 205-b may be sent with a different (e.g., longer) symbol duration relative to first random access preamble 205-a. The second random access preamble 205-b may have the same random access preamble format as the first random access preamble 205-a or a different random access preamble format. Use of the second frequency resource to the send second random access preamble 205-b, with the same or with a different preamble format relative to first random access preamble 205-a, may beneficially enhance the likelihood of successful reception and decoding of second random access preamble 205-b by base station 105-a, thus may conserve device or system (e.g., spectral) resource or reduce access latencies by reducing a likelihood of a third or subsequent random access preamble being transmitted by UE 115-a. Another benefit may be an enhanced ability of UE 115-a to establish a connection with base station 105-a when UE 115-a is distant from base station 105-a (e.g., near an edge of the coverage area 110-a) or otherwise has poor channel conditions.

Base station 105-a may receive the second random access preamble 205-b and, in response, may transmit a RAR 215 to UE 115-a. In some examples, the RAR 215 may be transmitted via the first frequency resource for the first random access preamble 205-*a* (or via a different frequency resource included with the same BWP, same CC, or same frequency subband as the first frequency resource). In some other examples, the RAR 215 may be transmitted via the second frequency resource for the second random access preamble 205-*b* (or via a different frequency resource included with the same BWP, same CC, or same frequency subband as the second frequency resource).

Base station 105-*a* may transmit one or more indications related to the use of the second frequency resource for the second random access preamble 205-*b*. For example, base station 105-*a* may transmit an indication of the first frequency resource to be used for the first random access preamble 205-*a*, an indication of the second frequency resource to be used for the second random access preamble 205-*b*, or both. In some cases, the indication of the first frequency resource, the indication of the second frequency resource to be used for the second random access preamble 205-*b*, or both may be included in one or more SIBs transmitted by base station 105-*a*. For example, the indication of the first frequency resource, the indication of the second frequency resource to be used for second random access preamble 205-*b*, or both may be included in remaining system information (RMSI), which may in some cases include a SIB1.

In some other examples, base station 105-*a* may transmit an indication of the frequency resource UE 115-*a* is to monitor for a RAR 215 in response to second random access preamble 205-*b* (e.g., whether UE 115-*a* is to monitor the first frequency resource or the second frequency resource) and transmit the RAR 215 via the indicated frequency resource. In some cases, the indication of the frequency resource UE 115-*a* is to monitor for a RAR 215 in response to second random access preamble 205-*b* may be included in one or more SIBs transmitted by base station 105-*a*. For example, an indication of the frequency resource via which RAR 215 in response to second-attempt random access preamble 205-*b* may be sent (e.g., whether such a RAR 215 may be sent via the first frequency resource or the second frequency resource) may be included in RMSI, which may, in some cases, include a SIB1.

Figure 3:
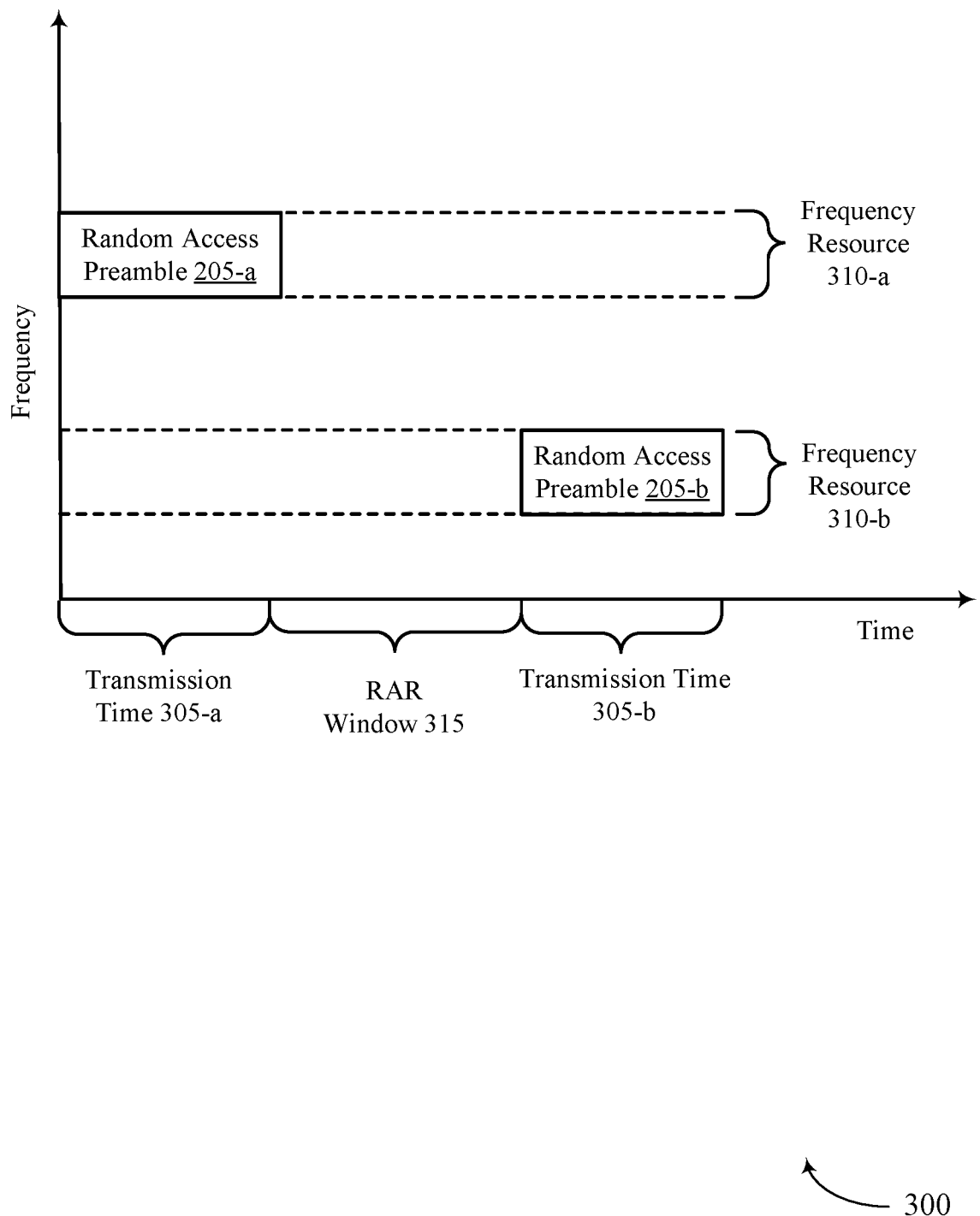
FIG. 3 illustrates an example of a resource timeline that supports random access via an alternative frequency resource in accordance with aspects of the present disclosure.

FIG. 3 illustrates an example of a resource timeline 300 that supports random access via an alternative frequency resource in accordance with aspects of the present disclosure. In some examples, resource timeline 300 may implement aspects of wireless communications systems 100, wireless communications system 200, or both. For example, Aspects of a random access procedure executed by a UE 115, as described with reference to FIG. 1 and FIG. 2, may be implemented according to resource timeline 300. For example, the resource timeline 300 may illustrate the frequency resource used by the UE 115 for first random access preamble 205-*a* and second random access preamble 205-*b* over time.

In some cases, a UE 115 may transmit first random access preamble 205-*a* based on broadcast information (e.g., an SSB, one or more SIBs) received from a base station 105. The UE 115 may transmit first random access preamble 205-*a* during transmission time 305-*a* and using first frequency resource 310-*a*. first frequency resource 310-*a* may be within a first BWP, a first CC, a first frequency subband, or any combination thereof. In some cases, first frequency resource 310-*a* may be indicated by the base station 105 (e.g., within system information, such as RMSI, or another broadcast transmission).

During a RAR window 315 (e.g., a time period after random access preamble 205-*a* is sent), the UE 115 may monitor first frequency resource 310-*a* for a RAR, or msg2, from the base station 105 in response to first random access preamble 205-*a*. however, the base station 105 may in some cases not receive or successfully decode first random access preamble 205-*a*, thus may not transmit a RAR during RAR window 315.

If the UE 115 does not receive a RAR while monitoring during the RAR window 315, the UE 115 may transmit second-attempt random access preamble 205-*b* during transmission time 305-*b* using frequency resource 310-*b*. In some cases, frequency resource 310-*a* may be different from frequency resource 310-*b*. For example, random access preamble 205-*b* may be transmitted within a different BWP, a different CC, or a different frequency subband, or any combination thereof relative to random access preamble 205-*a*. In some cases, second frequency resource 310-*b* may have a different subcarrier spacing than the first frequency resource 310-*a* (e.g., due to being within a different BWP, a different CC, or a different frequency subband, or any combination thereof). For example, the subcarrier spacing for second frequency resource 310-*b* may be smaller than the subcarrier spacing for first frequency resource 310-*a*. Accordingly, the symbols (e.g., OFDM symbols) may be longer for second random access preamble 205-*b* than for first random access preamble 205-*a*. In some examples, the UE 115 may transmit second random access preamble 205-*b* according to the same preamble format as first random access preamble 205-*a*, despite the use of a different, second frequency resource 310-*b*. In some other examples, the UE 115 may transmit second random access preamble 205-*b* according to a different preamble format than first random access preamble 205-*a*, and via a different second frequency resource 310-*b*.

In some examples, the base station 105 may transmit (e.g., broadcast) an indication of first frequency resource 310-*a*, second frequency resource 310-*b*, or both to the UE 115. For example, the base station 105 may transmit an indication identifying that first frequency resource 310-*a* is to be used for first (e.g., initial, first-attempt) random access preambles 205 and an indication identifying that second frequency resource 310-*b* is to be used for second (e.g., second-attempt) random access preambles 205 in the event no RAR is received for a corresponding first random access preamble 205. The base station 105 may transmit the indication of second frequency resource 310-*b* in a message including system information (e.g., RMSI). The base station 105 may monitor (e.g., on an ongoing basis) first frequency resource 310-*a* for first random access preambles 205 and may monitor (e.g., on an ongoing basis) second frequency resource 310-*b* for second random access preambles 205.

In some cases, a RAR in response to a second-attempt random access preamble (e.g., in response to second random access preamble 205-*b*) may be transmitted via the same frequency resource 310 used for the second-attempt random access preamble (e.g., via second frequency resource 310-*b*). Alternatively, a RAR to a second-attempt random access preamble (e.g., in response to second random access preamble 205-*b*) may be transmitted via the same frequency resource 310 used for a corresponding first-attempt random access preamble (e.g., via first frequency resource 310-*a* used for first random access preamble 205-*a*). The base station 105 may transmit (e.g., broadcast) an indication of the frequency resource via which a RAR will be transmitted in response to a second-attempt random access preamble (and thus the frequency resource that the UE 115 is to monitor for such a RAR). For example, the base station 105 may include such an indication in a system information transmission, such as a transmission of RMSI.

In some examples, whether a UE 115 is to send a second-attempt random access preamble via second frequency resource 310-*b* (e.g., as opposed to using first frequency resource 310-*a* that was used for a corresponding first-attempt random access preamble) may depend on the condition of a channel between the UE 115 and the base station 105. For example, use of second frequency resource 310-*b* for second-attempt random access preambles may be limited to UEs 115 having a channel quality below a threshold, which may conserve second frequency resource 310-*b* (e.g., reduce an associated collision probability) for UEs 115 that may benefit to a relatively greater degree. For example, the UE 115 may perform one or more signal quality measurements, such as a reference signal received power (RSRP) measurement based on a synchronization signal (e.g., as included within a broadcasted SSB). Thus, such measurements may, for example, occur prior to transmission time 305-*a* and the transmission of first random access preamble 205-*a*. If the one or more signal quality measurements (e.g., the RSRP measurement) are below a signal quality threshold, the UE 115 may transmit second random access preamble 205-*b* during transmission time 305-*b* using frequency resource 310-*b*. If the one or more signal quality measurements are above the signal quality threshold, the UE 115 may second random access preamble 205-*b* using first frequency resource 310-*a*. In some cases, the base station 105 may transmit (e.g., broadcast) an indication of the signal quality threshold. For example, the base station 105 may include such an indication in a system information transmission, such as a transmission of RMSI.

Figure 4:
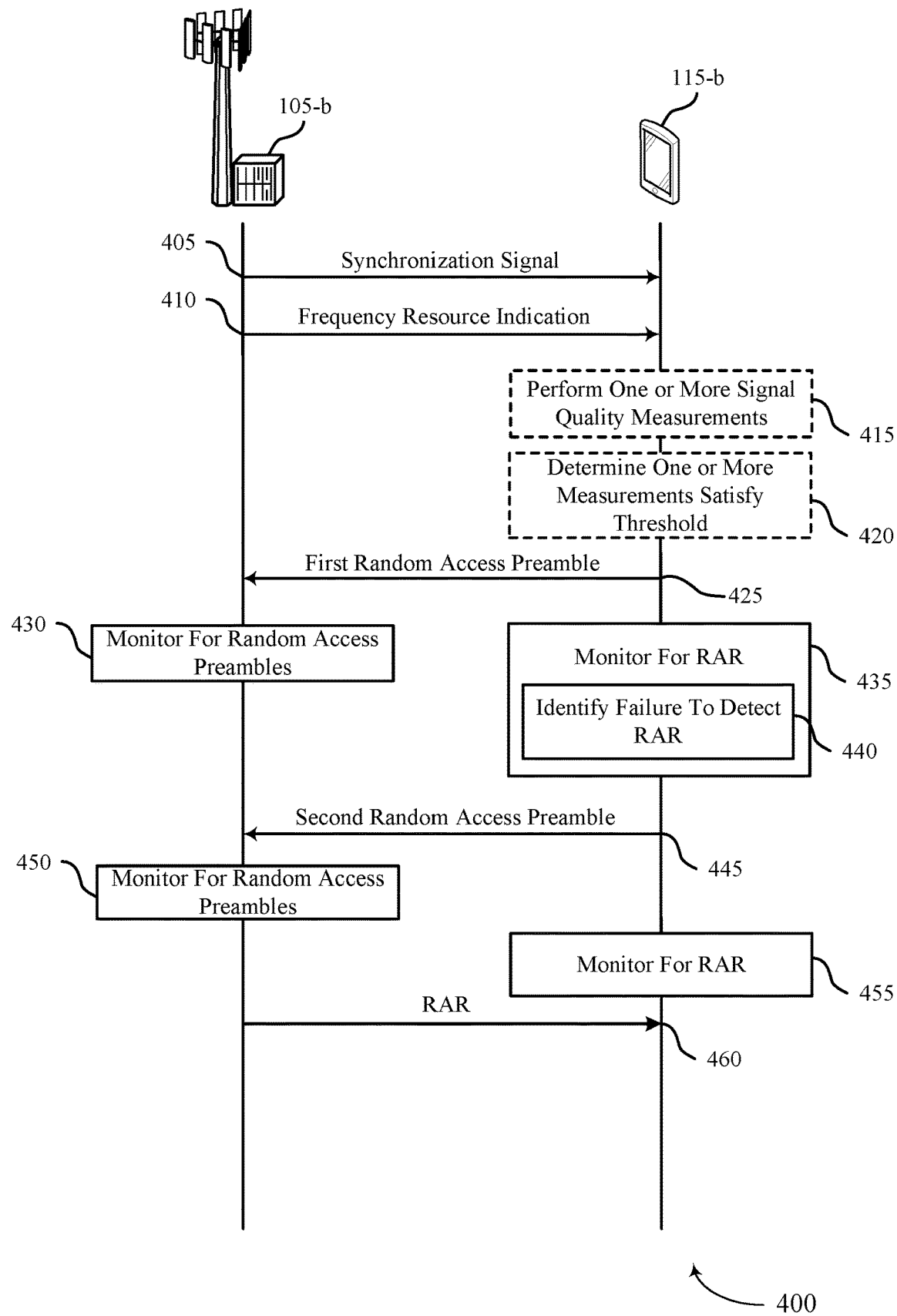
FIG. 4 illustrates an example of a process flow that supports random access via an alternative frequency resource in accordance with aspects of the present disclosure.

FIG. 4 illustrates an example of a process flow 400 that supports random access via an alternative frequency resource in accordance with aspects of the present disclosure. In some examples, process flow 400 may implement aspects of wireless communications system 100, wireless communications system 200, and resource timeline 300. The process flow 400 may illustrate an example of a UE 115, such as UE 115-*b*, transmitting an additional (e.g., second) random access preamble using a different frequency resource relative to a frequency resource used to transmit a prior (e.g., first) random access preamble. Alternative examples of the following may be implemented, where some processes are performed in a different order than described or are not performed. In some cases, processes may include additional features not mentioned below, or further processes may be added.

At 405, base station 105-*b* may broadcast a synchronization signal. For example, the synchronization signal may be a primary synchronization signal (PSS), a secondary synchronization signal (SSS), or a tertiary synchronization signal (TSS) included within an SSB.

At 410, base station 105-*b* may broadcast an indication of a first frequency resource to be used for first-attempt random access preambles, an indication of a second frequency resource to be used for at least some second-attempt random access preambles, or both. In some examples, base station 105-*b* may include some or all such indications in a system information transmission (e.g., in an RMSI transmission).

In some cases, base station 105-*b* may also transmit (e.g., at 410) an indication of a signal quality threshold associated with the use of the second frequency resource for second-attempt random access preambles. In some examples, base station 105-*b* may include the indication of the signal quality threshold in a system information transmission (e.g., in an RMSI transmission).

At 415, UE 115-*b* may perform one or more signal quality measurements on the synchronization signal received at 405. At 420, UE 115-*b* may determine the one or more signal quality measurements satisfy (e.g., are below) the threshold, and thus that UE 115-*b* may use the second frequency resource should UE 115-*b* transmit a second-attempt random access preamble. If UE 115-*b* determines that the one or more signal quality measurements fail to satisfy (e.g., are above) the threshold, UE 115-*b* may determine that UE 115-*b* may use the first frequency resource should UE 115-*b* transmit a second-attempt random access preamble.

At 425, UE 115-*b* may transmit a first random access preamble via the first frequency resource. The first frequency resource may be within or otherwise correspond to a first BWP, a first CC, a first frequency subband, or any combination thereof. In some cases, UE 115-*b* may transmit the first random access preamble using a first subcarrier spacing and a first random access preamble format.

At 430, base station 105-*b* may monitor the first frequency resource for random access preambles. Though illustrated as occurring at a particular time within the process flow 400, it is to be understood that base station 105-*b* may monitor the first frequency resource for random access preambles on an ongoing basis (e.g., throughout a time period before, during, and after the time period for process flow 400). In some cases, base station 105-*a* may not receive the first random access preamble at 420, and thus base station 105-*b* may not transmit any RAR associate with the first random access preamble, as is illustrated in process flow 400.

At 435, UE 115-*b* may monitor for a RAR for the first random access preamble for a time period (e.g., a RAR window) after transmitting the first random access preamble at 420. At 440, UE 115-*b* may identify a failure to detect the RAR within the time period.

At 445, UE 115-*b* may transmit a second random access preamble based on failing to detect the RAR at 440. UE 115-*b* may transmit the second random access preamble using a second frequency resource, which may be within or otherwise correspond to a different BWP, a different CC, a different frequency subband, or any combination thereof relative to the first frequency resource used at 420. In some cases, UE 115-*b* may transmit the second random access preamble using a second subcarrier spacing. In some cases, the second subcarrier spacing may be different from the first subcarrier spacing. For example, the second subcarrier spacing may be smaller than the first subcarrier spacing. Additionally or alternatively, UE 115-*b* may transmit the second random access preamble using a different symbol duration than the first random access preamble. For example, UE 115-*b* the symbol duration for the second random access preamble may be longer than the symbol duration for the first random access preamble. In some examples, UE 115-*b* may transmit the second random access preamble using a different preamble format than the first random access preamble. In some other examples, UE 115-*b* may transmit the second random access preamble using the same preamble format as the first random access preamble. In some examples, UE 115-*b* may transmit the second random access preamble using the second frequency resource based on the one or more measurements at 415 satisfying the threshold.

At 450, base station 105-*b* may monitor the second frequency resource for second random access preambles. In some cases, each second random access preamble may be associated with a respective, prior first random access preamble that was not successfully received or decoded by base station 105-*b*. Though illustrated as occurring at a particular time within the process flow 400, it is to be understood that base station 105-*b* may monitor the second frequency resource for random access preambles on an ongoing basis (e.g., throughout a time period before, during, and after the time period for process flow 400).

At 455, UE 115-*b* may monitor for a time period after transmitting the second random access preamble for a RAR associated with the second random access preamble. In some cases, UE 115-*b* may monitor the first frequency resource. In some other cases, UE 115-*b* may monitor the second frequency resource. In some examples, base station 105-*b* may indicate to UE 115-*b* which frequency resource to monitor (e.g., in the frequency resource indication at 410, such as part of RMSI or other system information).

At 460, base station 105-*b* may transmit a RAR to UE 115-*b* for the second random access preamble received at 445. Base station 105-*b* may transmit the RAR via the first frequency resource or the second frequency resource (e.g., whichever may have been previously indicated to UE 115-*b*).

Figure 5:
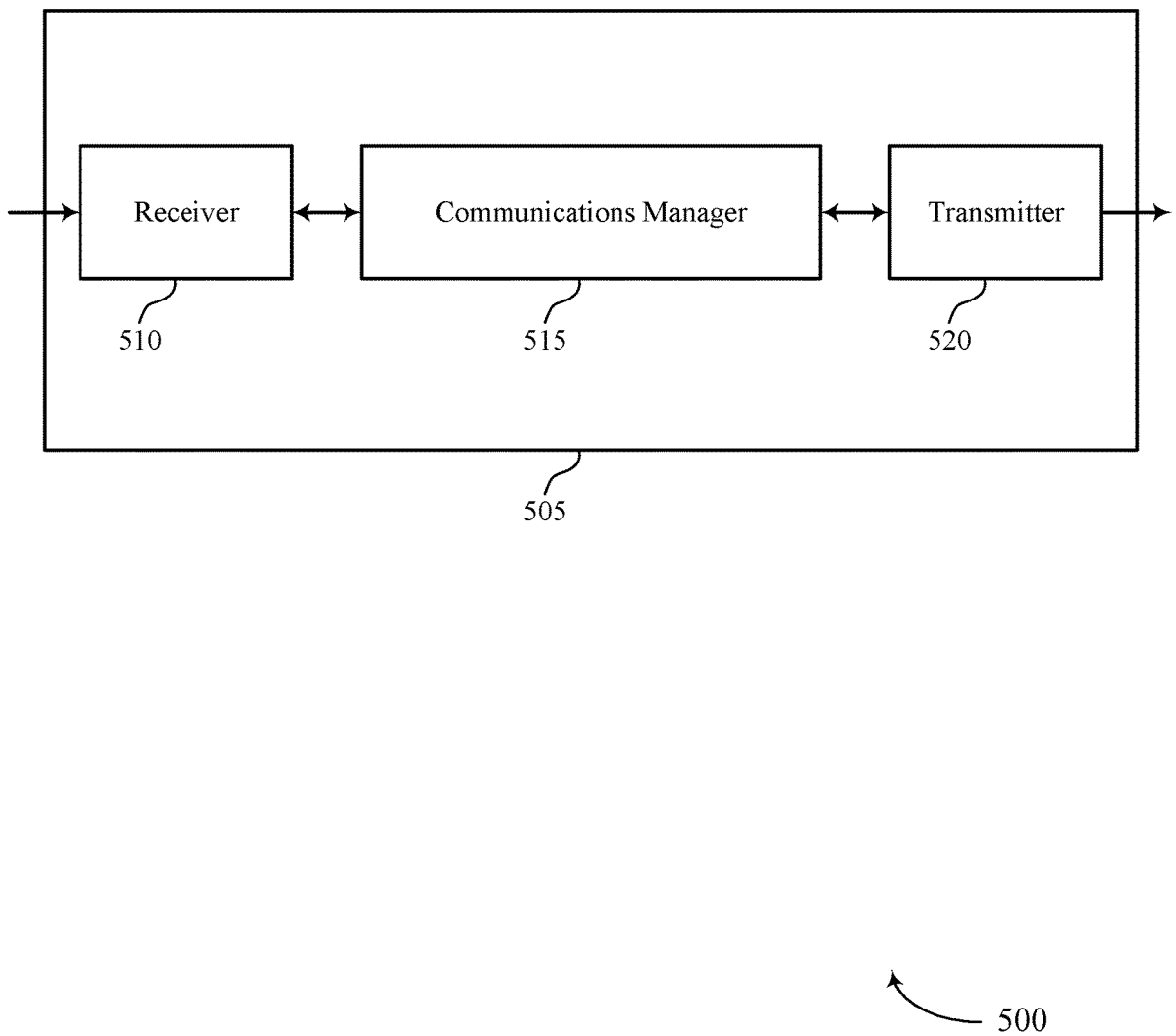
FIGS. 5 and 6 show block diagrams of devices that support random access via an alternative frequency resource in accordance with aspects of the present disclosure.

FIG. 5 shows a block diagram 500 of a device 505 that supports random access via an alternative frequency resource in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to random access via an alternative frequency resource). Information may be passed on to other components of the device 505. The receiver 510 may be an example of aspects of the transceiver 820 described with reference to FIG. 8. The receiver 510 may utilize a single antenna or a set of antennas.

The communications manager 515 may transmit, to a base station, a first-attempt random access preamble via a first frequency resource. The first frequency resource may be within a first BWP, a first CC, a first frequency subband, or any combination thereof. The communications manager 515 may monitor, for a time period after transmitting the first-attempt random access preamble, for a RAR corresponding to the first-attempt random access preamble, identify, based on the monitoring, a failure to detect the RAR within the time period, and transmit, to the base station and based on the failure to detect the RAR, a second-attempt random access preamble via a second frequency resource. In some cases, the second frequency resource may be within a second BWP, a second CC, a second frequency subband, or any combination thereof and may be different from the first frequency resource. The communications manager 515 may be an example of aspects of the communications manager 810 described herein.

The actions performed by the communications manager 515 as described herein may be implemented to realize one or more potential advantages. One implementation may enable a UE to transmit an additional (e.g., second-attempt) random access preamble using a different frequency resource than an initial (e.g., first-attempt) random access preamble. The additional random access preamble may enable a UE to increase the coverage area (e.g., range extension) for communications with a base station, which may result in improved signal quality during a random access procedure at the UE, among other advantages.

Based on implementing the second-attempt random access preamble as described herein, a processor of a UE or base station (e.g., a processor controlling the receiver 510, the communications manager 515, the transmitter 520, or a combination thereof) may reduce the impact or likelihood of inefficient resource utilization related to random access preamble transmissions while ensuring relatively efficient communications. For example, the random access preamble transmission techniques described herein may leverage an alternative BWP, CC, or frequency subband for an additional random access preamble transmission to reduce interference associated with random access preamble retransmissions, which may realize resource allocation improvements, among other benefits.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate-array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

By including or configuring the communications manager 515 in accordance with examples as described herein, the device 505 (e.g., a processor controlling or otherwise coupled to the receiver 510, the transmitter 520, the communications manager 515, or a combination thereof) may support techniques for an enhanced preamble signaling scheme, resulting in more efficient utilization of communication resources.

Figure 6:
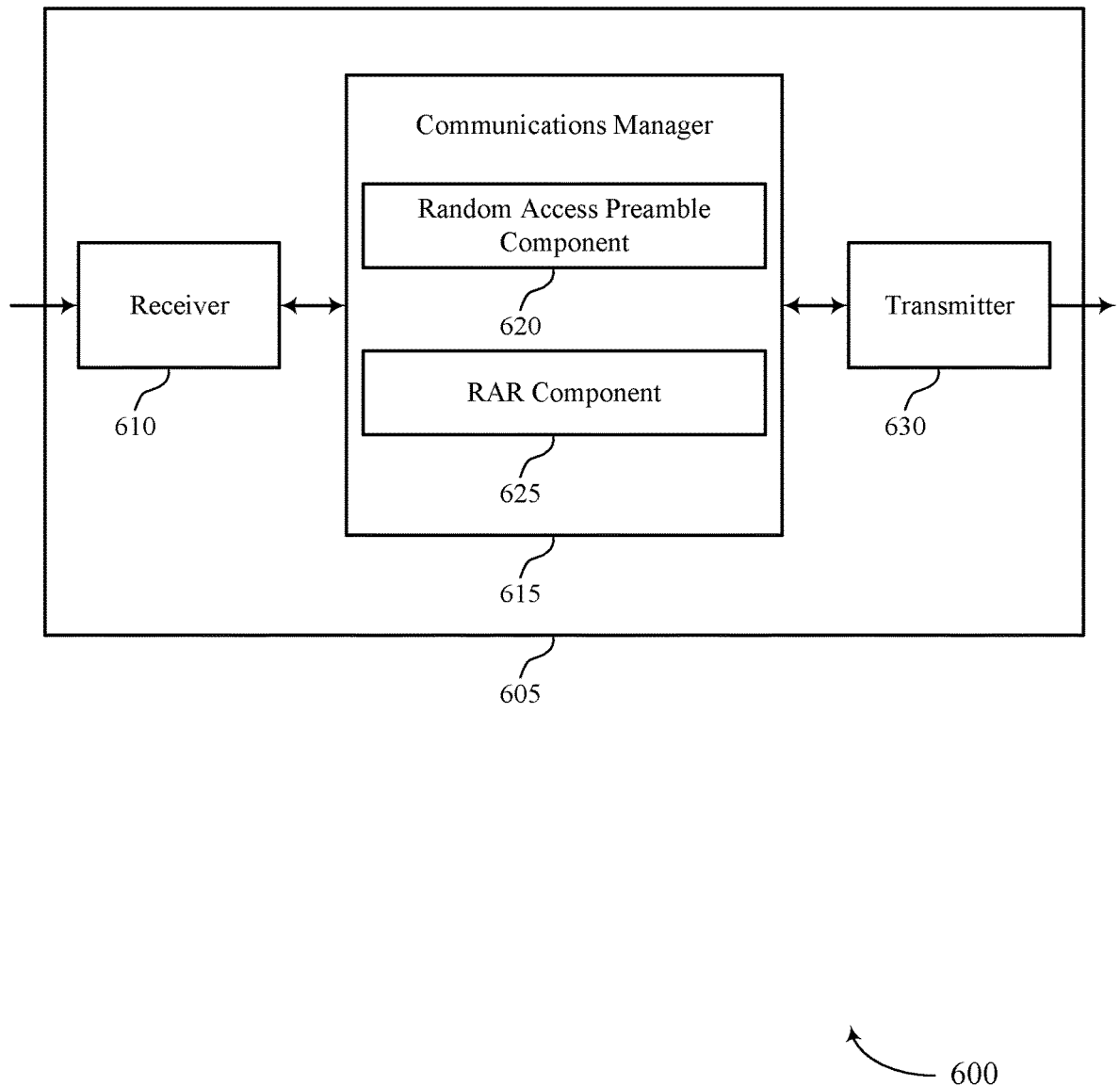

FIG. 6 shows a block diagram 600 of a device 605 that supports random access via an alternative frequency resource in accordance with aspects of the present disclosure. The device 605 may be an example of aspects of a device 505, or a UE 115 as described herein. The device 605 may include a receiver 610, a communications manager 615, and a transmitter 630. The device 605 may also include a processor. Each of these components may be in communication with one another (e.g., via one or more buses).

The receiver 610 may receive information such as packets, user data, or control information associated with various information channels (e.g., control channels, data channels, and information related to random access via an alternative frequency resource). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a random access preamble component 620 and a RAR component 625. The communications manager 615 may be an example of aspects of the communications manager 810 described herein.

The random access preamble component 620 may transmit, to a base station, a first-attempt random access preamble via a first frequency resource. The first frequency resource may be within a first BWP, a first CC, a first frequency subband, or any combination thereof. The RAR component 625 may monitor, for a time period after transmitting the first-attempt random access preamble, for a RAR corresponding to the first-attempt random access preamble and identify, based on the monitoring, a failure to detect the RAR within the time period. The random access preamble component 620 may transmit, to the base station and based on the failure to detect the RAR, a second-attempt random access preamble. The random access preamble component 620 may transmit the second-attempt random access preamble via a second frequency resource. In some examples, the second frequency resource may be within a second BWP, a second CC, a second frequency subband, or any combination thereof and may be different from the first frequency resource.

The transmitter 630 may transmit signals generated by other components of the device 605. In some examples, the transmitter 630 may be collocated with a receiver 610 in a transceiver module. For example, the transmitter 630 may be an example of aspects of the transceiver 820 described with reference to FIG. 8. The transmitter 630 may utilize a single antenna or a set of antennas.

Figure 7:
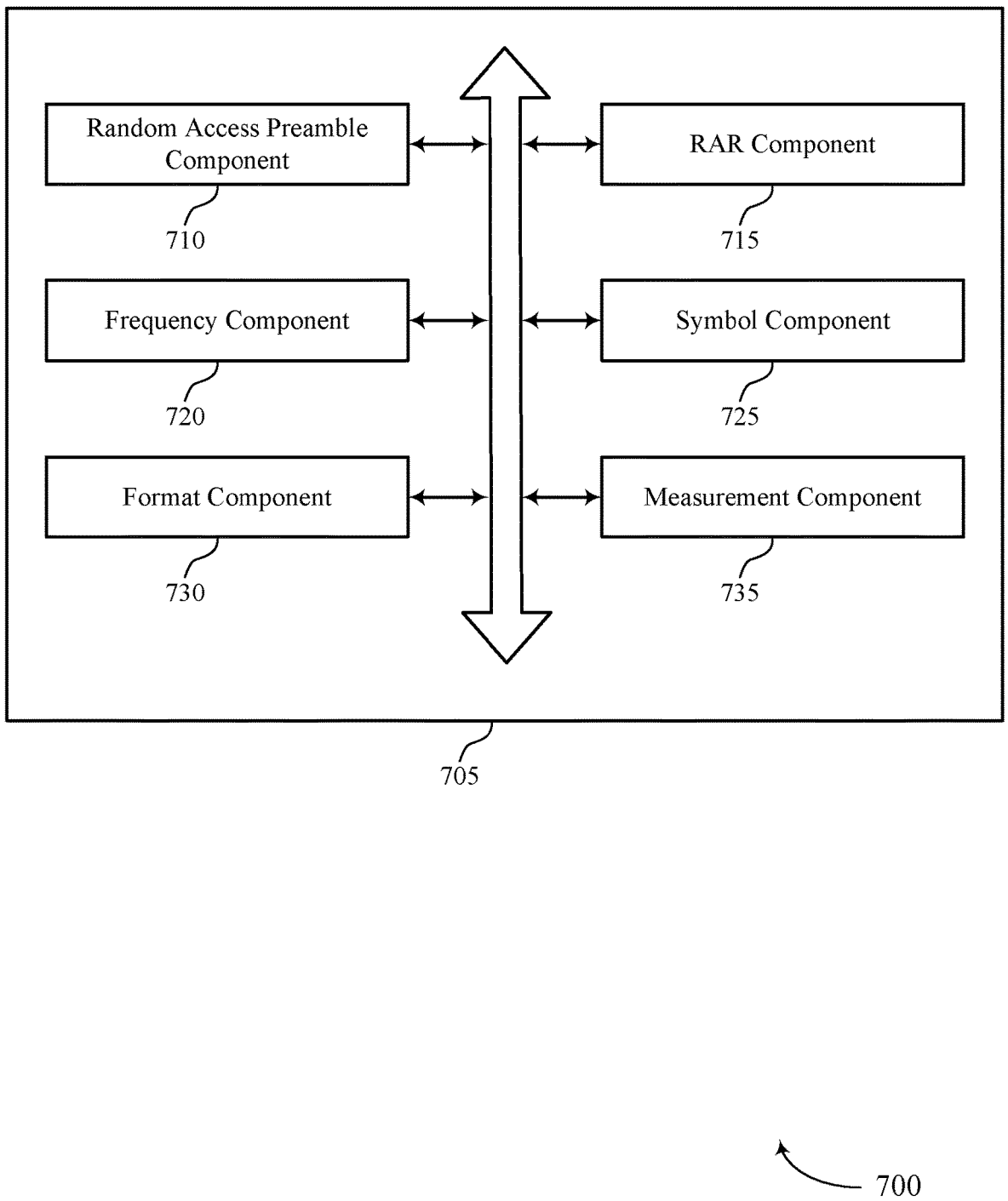
FIG. 7 shows a block diagram of a communications manager that supports random access via an alternative frequency resource in accordance with aspects of the present disclosure.

FIG. 7 shows a block diagram 700 of a communications manager 705 that supports random access via an alternative frequency resource in accordance with aspects of the present disclosure. The communications manager 705 may be an example of aspects of a communications manager 515, a communications manager 615, or a communications manager 810 described herein. The communications manager 705 may include a random access preamble component 710, a RAR component 715, a frequency component 720, a symbol component 725, a format component 730, and a measurement component 735. Each of these modules may communicate, directly or indirectly, with one another (e.g., via one or more buses). The communications manager 705 may be included in a UE.

The random access preamble component 710 may cause the UE to transmit, to a base station, a first-attempt random access preamble via a first frequency resource. The first frequency resource may be within a first BWP, a first CC, a first frequency subband, or any combination thereof.

The RAR component 715 may monitor, for a time period after transmitting the first-attempt random access preamble, for a RAR corresponding to the first-attempt random access preamble. In some examples, the RAR component 715 may identify, based on the monitoring, a failure to detect the RAR within the time period.

In some examples, the random access preamble component 710 may cause the UE to transmit, to the base station and based on the failure to detect the RAR, a second-attempt random access preamble. In some examples, the random access preamble component 710 may cause the UE to transmit the second-attempt random access preamble via a second frequency resource. In some examples, the second frequency resource may be within a second BWP, a second CC, a second frequency subband, or any combination thereof and may be different from the first frequency resource.

In some examples, the RAR component 715 may monitor, for a second time period after transmitting the second-attempt random access preamble, for a second RAR corresponding to the second-attempt random access preamble. In some examples, monitoring for the second RAR includes monitoring the first frequency resource. In some examples, monitoring for the second RAR includes monitoring the second frequency resource.

The frequency component 720 may cause the random access preamble component 710 to cause the UE to transmit the first-attempt random access preamble via the first frequency resource and the second-attempt random access preamble via the second frequency resource. The first frequency resource may have a first subcarrier spacing, and the second frequency resource may have a second subcarrier spacing that is different from the first subcarrier spacing. In some cases, the second subcarrier spacing is smaller than the first subcarrier spacing.

In some examples, the frequency component 720 may receive, from the base station, an indication of a frequency resource that the RAR component 715 is to monitor for the second RAR, where monitoring for the second RAR is based on the indication. In some examples, the frequency component 720 may receive, from the base station, an indication of the second frequency resource. In some examples, the frequency component 720 may receive system information that includes the indication of the second frequency resource. In some cases, the system information includes RMSI that includes the indication of the second frequency resource.

The symbol component 725 may cause the random access preamble component 710 to cause the UE to transmit the first-attempt random access preamble using a first symbol duration and the second-attempt random access preamble using a second symbol duration. In some examples, transmitting the second-attempt random access preamble via the second frequency resource includes transmitting the second-attempt random access preamble using a second symbol duration that is longer than the first symbol duration.

The format component 730 may cause the random access preamble component 710 to transmit first-attempt random access preamble according to a first preamble format. In some examples, the format component 730 may cause the random access preamble component 710 to cause the UE to transmit the second-attempt random access preamble according to a second preamble format that is different than the first preamble format. In some other examples, the format component 730 may cause the random access preamble component 710 to cause the UE to transmit the first-attempt random access preamble according to a preamble format and the second-attempt random access preamble according to the same preamble format.

The measurement component 735 may receive, from the base station, a synchronization signal prior to transmitting the first-attempt random access preamble. The synchronization signal may be an SSB. In some examples, the measurement component 735 may perform one or more signal quality measurements on the synchronization signal. In some examples, the measurement component 735 may determine that the one or more measurements satisfy a threshold, where transmitting the second-attempt random access preamble via the second frequency resource is based on determining that the one or more measurements satisfy the threshold. In some cases, the one or more measurements include a RSRP for the synchronization signal. In some examples, determining that the one or more measurements satisfy the threshold includes determining that the RSRP is below the threshold. In some examples, the measurement component 735 may receive, from the base station, an indication of the threshold.

Figure 8:
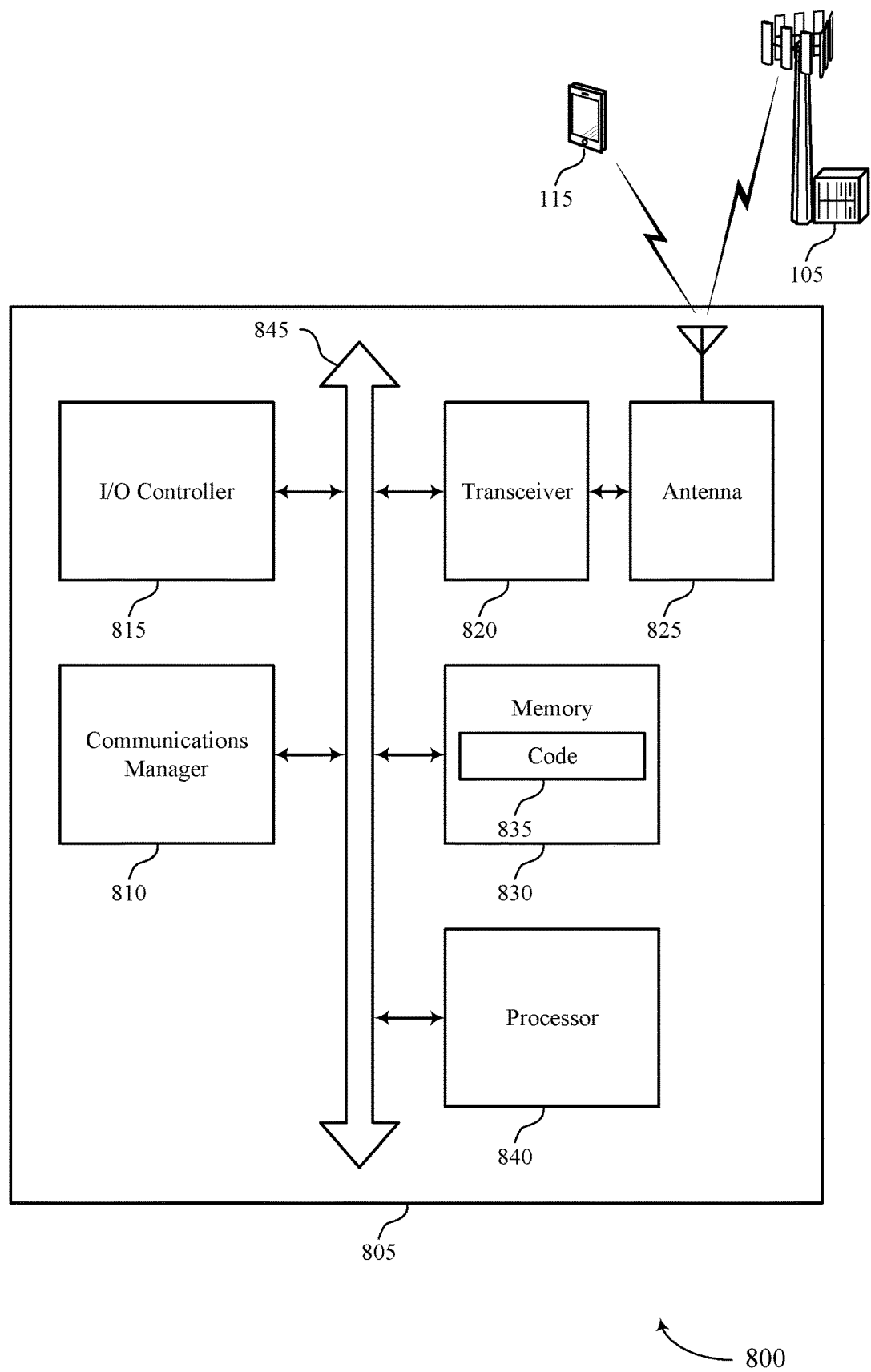
FIG. 8 shows a diagram of a system including a device that supports random access via an alternative frequency resource in accordance with aspects of the present disclosure.

FIG. 8 shows a diagram of a system 800 including a device 805 that supports random access via an alternative frequency resource in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may transmit, to a base station, a first-attempt random access preamble via a first frequency resource. The first frequency resource may be within a first BWP, a first CC, a first frequency subband, or any combination thereof, monitor, for a time period after transmitting the first-attempt random access preamble, for a RAR corresponding to the first-attempt random access preamble, identify, based on the monitoring, a failure to detect the RAR within the time period, and transmit, to the base station and based on the failure to detect the RAR, a second-attempt random access preamble. In some examples, the communications manager 810 may transmit the second-attempt random access preamble via a second frequency resource In some examples, the second frequency resource may be within a second BWP, a second CC, a second frequency subband, or any combination thereof and may be different from the first frequency resource.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In some other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases, the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting random access via an alternative frequency resource).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

By including or configuring the communications manager 810 in accordance with examples as described herein, the device 805 may support techniques for a more reliable random access procedure, improving communication reliability, reducing power consumption, improved coordination between devices, among other improved outcomes.

Figure 9:
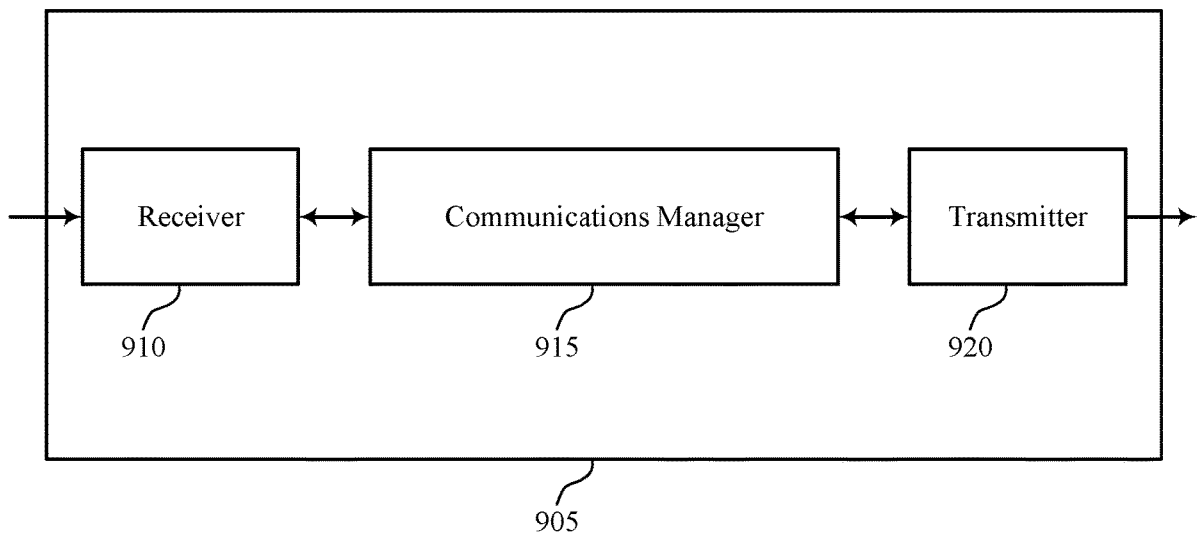
FIGS. 9 and 10 show block diagrams of devices that support random access via an alternative frequency resource in accordance with aspects of the present disclosure.

FIG. 9 shows a block diagram 900 of a device 905 that supports random access via an alternative frequency resource in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to random access via an alternative frequency resource). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit an indication of a first frequency resource for first-attempt random access preambles and an indication of a second frequency resource for second-attempt random access preambles, the second frequency resource different from the first frequency resource, wherein each second-attempt random access preamble is associated with a prior respective first-attempt random access preamble. In some cases, the first frequency resource may be within a first BWP, a first CC, a first frequency subband, or any combination thereof. The communications manager 915 may monitor the first frequency resource for the first-attempt random access preambles and the second frequency resource for second-attempt random access preambles. In some cases, the second frequency resource may be within a second BWP, a second CC, a second frequency subband, or any combination thereof. The communications manager 915 may receive, based on monitoring the second frequency resource, a second-attempt random access preamble from a UE, in some examples, via the second frequency resource. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

By including or configuring the communications manager 515 in accordance with examples as described herein, the device 915 may support techniques for an enhanced preamble signaling scheme, resulting in more efficient utilization of communication resources.

Figure 10:
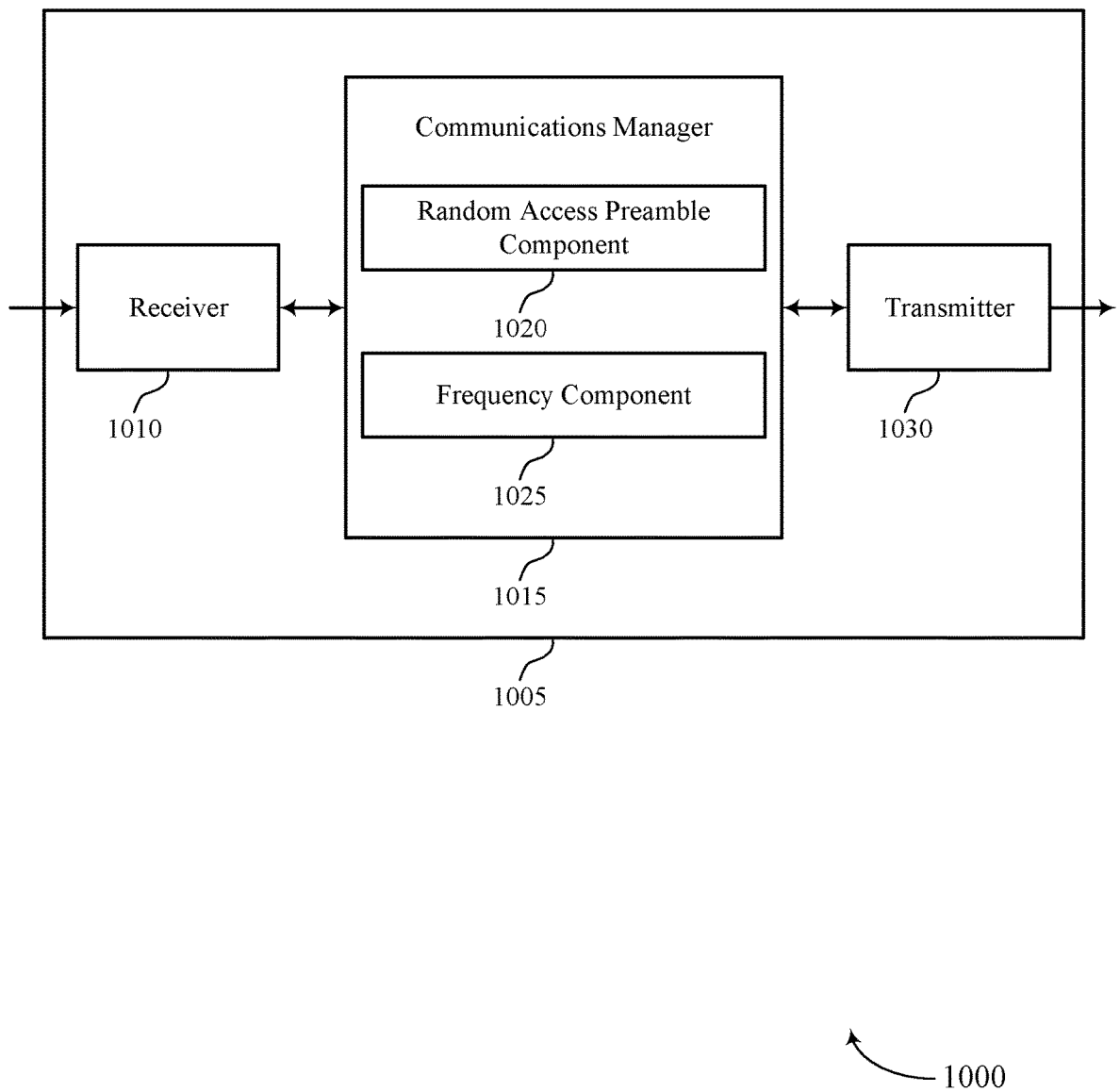

FIG. 10 shows a block diagram 1000 of a device 1005 that supports random access via an alternative frequency resource in accordance with aspects of the present disclosure. The device 1005 may be an example of aspects of a device 905, or a base station 105 as described herein. The device 1005 may include a receiver 1010, a communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to random access via an alternative frequency resource). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a random access preamble component 1020 and a frequency component 1025. The communications manager 1015 may be an example of aspects of the communications manager 1210 described herein.

The frequency component 1025 may transmit an indication of a first frequency resource for first-attempt random access preambles and an indication of a second frequency resource for second-attempt random access preambles, the second frequency resource different from the first frequency resource, wherein each second-attempt random access preamble is associated with a prior respective first-attempt random access preamble. In some cases, the first frequency resource may be within a first BWP, a first CC, a first frequency subband, or any combination thereof. The random access preamble component 1020 may monitor the first frequency resource for the first-attempt random access preambles and the second frequency resource for second-attempt random access preambles. In some cases, the second frequency resource may be within a second BWP, a second CC, a second frequency subband, or any combination thereof. The random access preamble component 1020 may receive, based on monitoring the second frequency resource, a second-attempt random access preamble from a UE, in some examples, via the second frequency resource.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
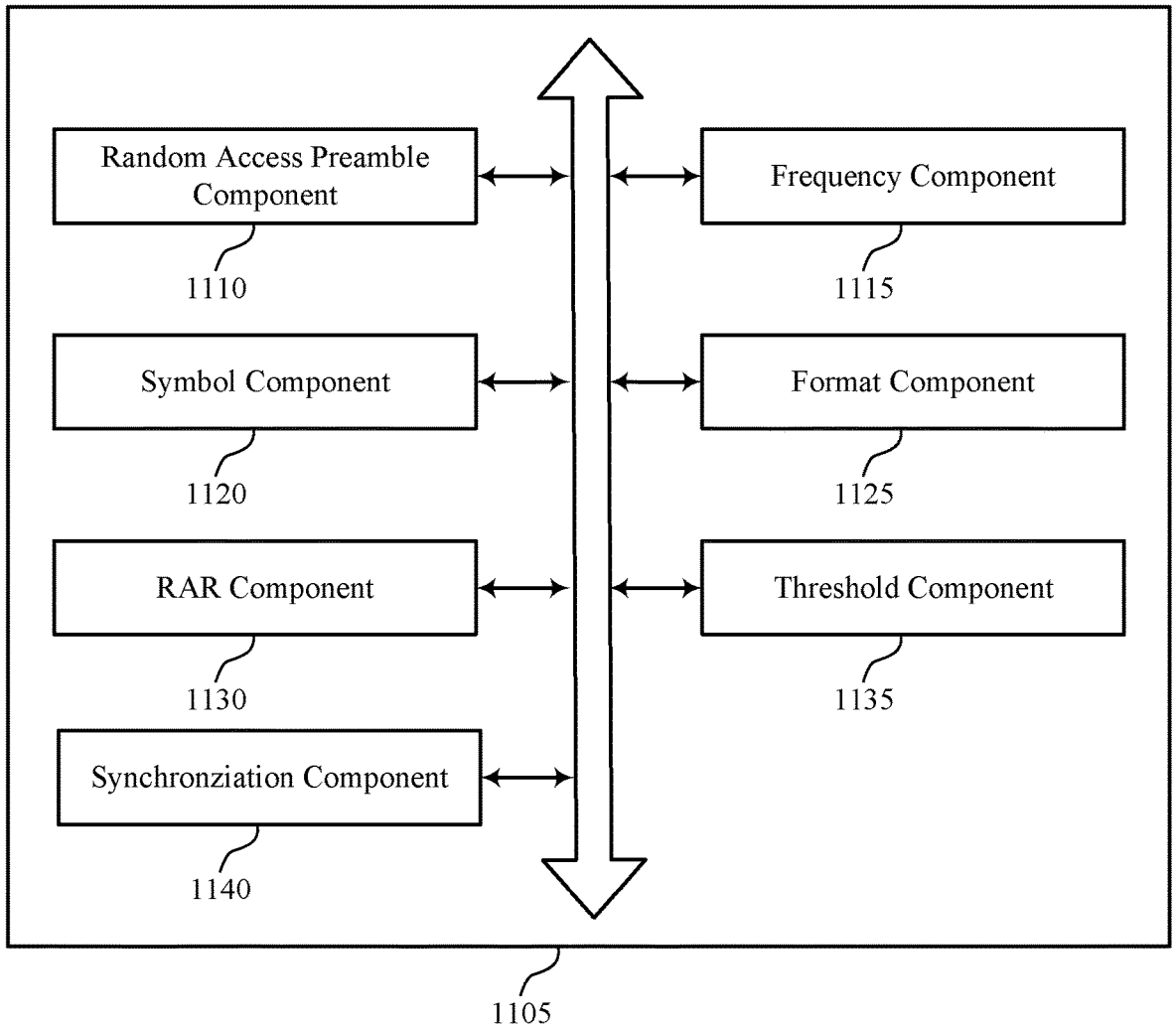
FIG. 11 shows a block diagram of a communications manager that supports random access via an alternative frequency resource in accordance with aspects of the present disclosure.

FIG. 11 shows a block diagram 1100 of a communications manager 1105 that supports random access via an alternative frequency resource in accordance with aspects of the present disclosure. The communications manager 1105 may be an example of aspects of a communications manager 915, a communications manager 1015, or a communications manager 1210 described herein. The communications manager 1105 may include a random access preamble component 1110, a frequency component 1115, a symbol component 1120, a format component 1125, a RAR component 1130, a threshold component 1135, and a synchronization component 1140. Each of these modules may communicate, directly or indirectly, with one another (e.g., via one or more buses). The communications manager 1105 may be included in a base station.

The random frequency component 115 may cause the base station to transmit an indication of a first frequency resource for first-attempt random access preambles and an indication of a second frequency resource for second-attempt random access preambles, the second frequency resource different from the first frequency resource, where each second-attempt random access preamble is associated with a prior respective first-attempt random access preamble. In some cases, the first frequency resource may be within a first BWP, a first CC, a first frequency subband, or any combination thereof. In some examples, the random access preamble component 1110 may monitor the first frequency resource for the first-attempt random access preamble. The random access preamble component 1110 may monitor the second frequency resource for the second random access preambles. In some cases, the second frequency resource may be within a second BWP, a second CC, a second frequency subband, or any combination thereof. In some examples, the random access preamble component 1110 may receive, based on monitoring the second frequency resource, a second-attempt random access preamble from a UE, in some examples, via the second frequency resource.

In some examples, the frequency component 1115 may cause the base station to broadcast the indication of the second frequency resource. In some examples, the frequency component 1115 may cause the base station to transmit system information for a cell associated with the base station, the system information including the indication of the second frequency resource. In some cases, the system information includes RMSI that includes the indication of the second frequency resource.

In some examples, the frequency component 1115 may cause the base station to transmit, to the UE, an indication of a frequency resource to monitor for RARs corresponding to the second-attempt random access preambles. In some examples, the frequency component 1115 may cause the base station to transmit the indication of the second frequency resource prior to monitoring the second frequency resource for second-attempt random access preambles.

In some cases, the first frequency resource has a first subcarrier spacing. In some cases, the second frequency resource has a second subcarrier spacing that is different from the first subcarrier spacing. In some cases, the second subcarrier spacing is smaller than the first subcarrier spacing.

In some cases, the first frequency resource corresponds to a first symbol duration and the second frequency resource corresponds to a second symbol duration that is longer than the first symbol duration. Additionally or alternatively, each second-attempt random access preamble has a different preamble format than its respective first-attempt random access preamble. In some cases, each second-attempt random access preamble has a same preamble format as its respective first-attempt random access preamble.

The RAR component 1130 may cause the base station to transmit, to the UE in response to the second-attempt random access preamble, a RAR via the first frequency resource. In some examples, the RAR component 1130 may cause the base station to transmit, to the UE in response to the second-attempt random access preamble, a RAR via the second frequency resource.

The synchronization component 1140 may cause the base station to transmit a synchronization signal, where the second frequency resource is for second-attempt random access preambles from one or more UEs when, for the one or more UEs, a signal quality of the synchronization signal is below a signal quality threshold and the first frequency resource is for second-attempt random access preambles from the one or more UEs when, for the one or more UEs, the signal quality of the synchronization signal satisfies the signal quality threshold. In some examples, transmitting the synchronization signal includes transmitting an SSB that includes the synchronization signal. In some examples, the threshold component 1135 may cause the base station to transmit, to the one or more UEs, an indication of the signal quality threshold.

Figure 12:
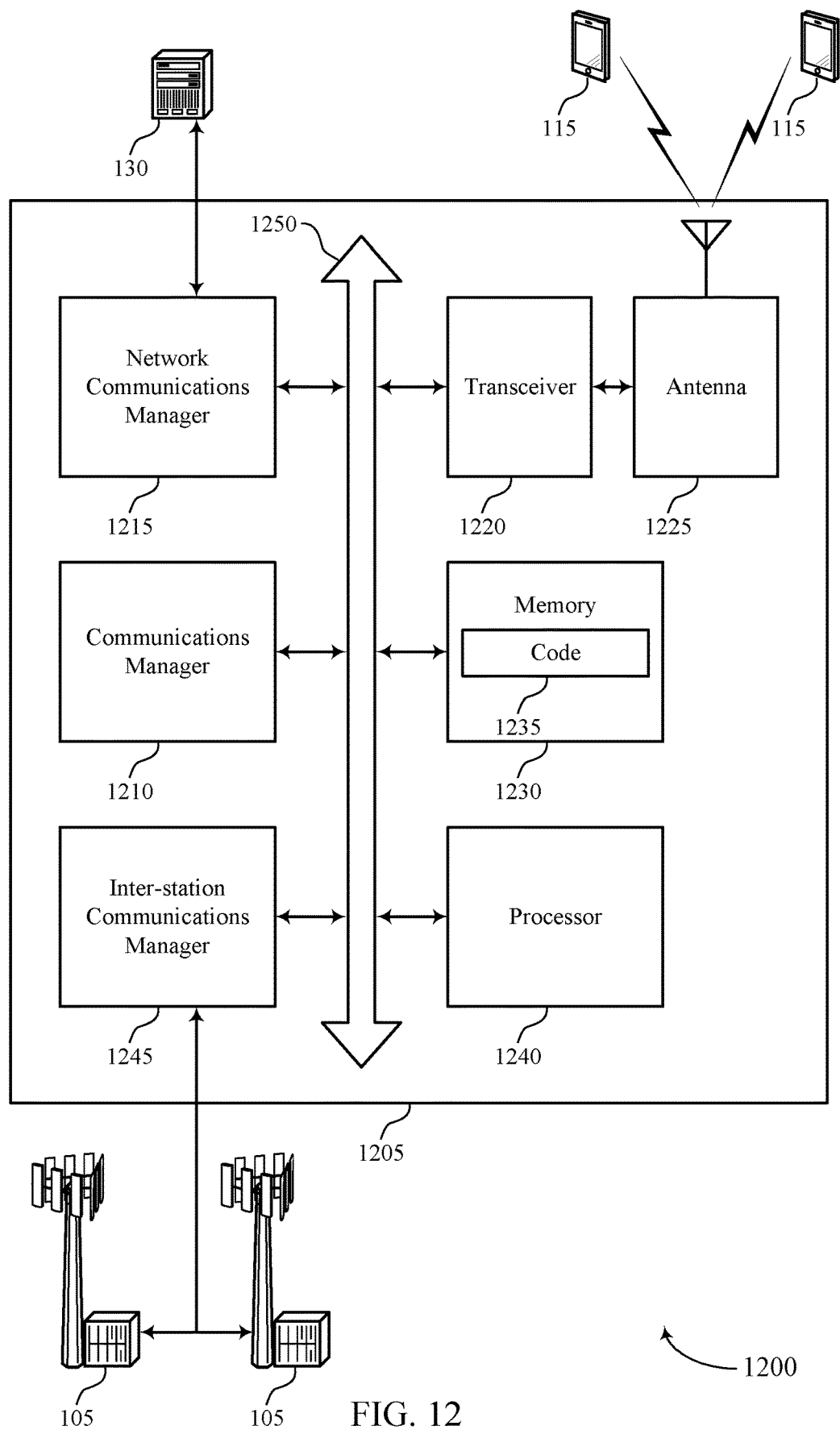
FIG. 12 shows a diagram of a system including a device that supports random access via an alternative frequency resource in accordance with aspects of the present disclosure.

FIG. 12 shows a diagram of a system 1200 including a device 1205 that supports random access via an alternative frequency resource in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit an indication of a first frequency resource for first-attempt random access preambles and an indication of a second frequency resource for second-attempt random access preambles, the second frequency resource different from the first frequency resource, wherein each second-attempt random access preamble is associated with a prior respective first-attempt random access preamble. In some cases, the first frequency resource may be within a first BWP, a first CC, a first frequency subband, or any combination thereof. The communications manager 1210 may monitor the first frequency resource for the first-attempt random access preambles and the second frequency resource for second-attempt random access preambles. In some cases, the second frequency resource may be within a second BWP, a second CC, a second frequency subband, or any combination thereof. The communications manager 1210 may receive, based on monitoring the second frequency resource, a second-attempt random access preamble from a UE, in some examples, via the second frequency resource.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases, the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting random access via an alternative frequency resource).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

By including or configuring the network communications manager 1215 in accordance with examples as described herein, the device 1205 may support techniques for a more reliable random access procedure, improving communication reliability, reducing power consumption, improved coordination between devices, among other improved outcomes.

Figure 13:
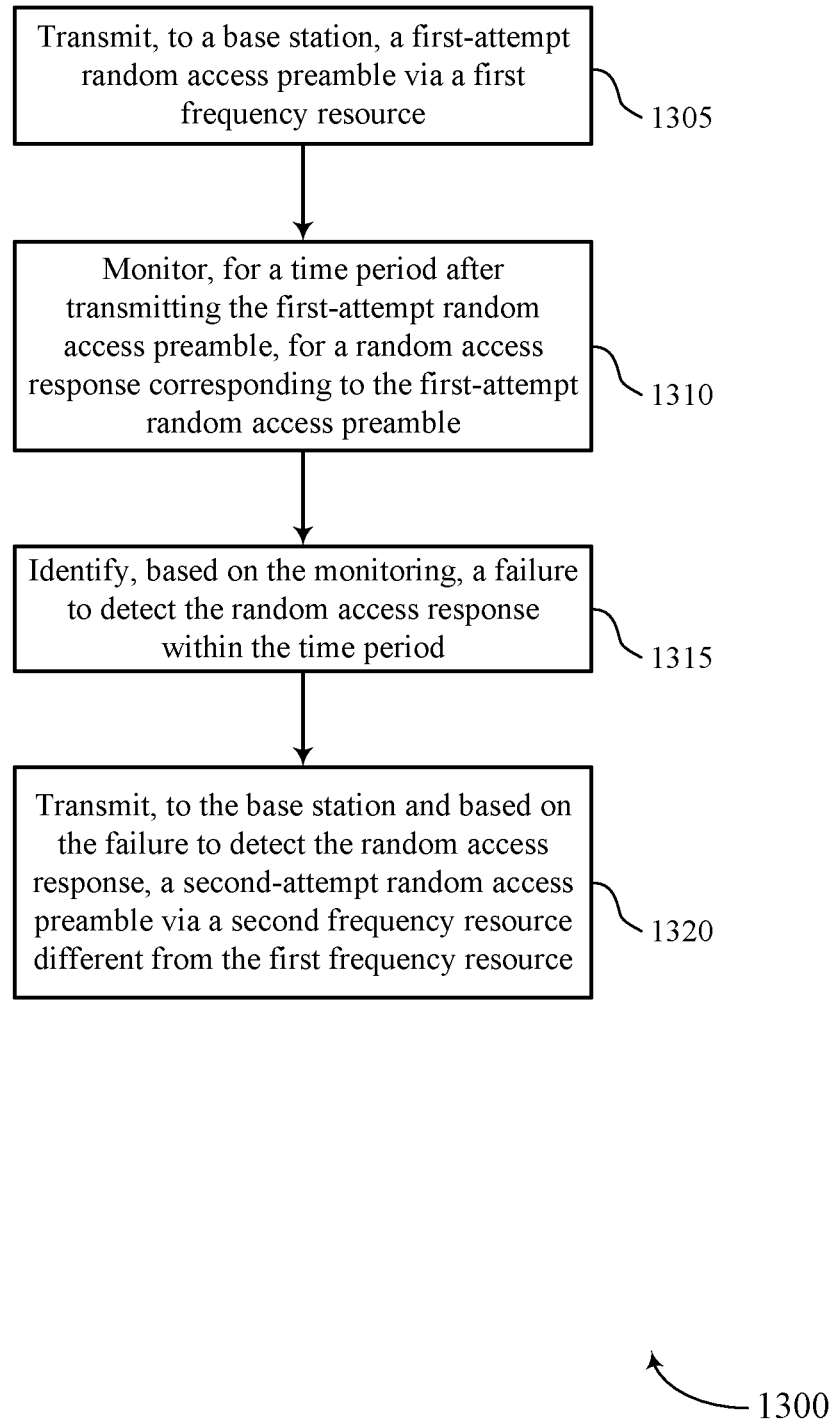
FIGS. 13 through 16 show flowcharts illustrating methods that support random access via an alternative frequency resource in accordance with aspects of the present disclosure.

FIG. 13 shows a flowchart illustrating a method 1300 that supports random access via an alternative frequency resource in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may transmit, to a base station, a first-attempt random access preamble via a first frequency resource. The first frequency resource may be within a first BWP, a first CC, a first frequency subband, or any combination thereof. The operations of 1305 may be performed according to the methods described herein. In some examples, aspects of the operations of 1305 may be performed by a random access preamble component as described with reference to FIGS. 5 through 8.

At 1310, the UE may monitor, for a time period after transmitting the first-attempt random access preamble, for a RAR corresponding to the first-attempt random access preamble. The operations of 1310 may be performed according to the methods described herein. In some examples, aspects of the operations of 1310 may be performed by a RAR component as described with reference to FIGS. 5 through 8.

At 1315, the UE may identify, based on the monitoring, a failure to detect the RAR within the time period. The operations of 1315 may be performed according to the methods described herein. In some examples, aspects of the operations of 1315 may be performed by a RAR component as described with reference to FIGS. 5 through 8.

At 1320, the UE may transmit, to the base station and based on the failure to detect the RAR, a second-attempt random access preamble. In some cases, the UE may transmit the second-attempt random access preamble via a second frequency resource In some examples, the second frequency resource may be within a second BWP, a second CC, a second frequency subband, or any combination thereof and may be different from the first frequency resource. The operations of 1320 may be performed according to the methods described herein. In some examples, aspects of the operations of 1320 may be performed by a random access preamble component as described with reference to FIGS. 5 through 8.

Figure 14:
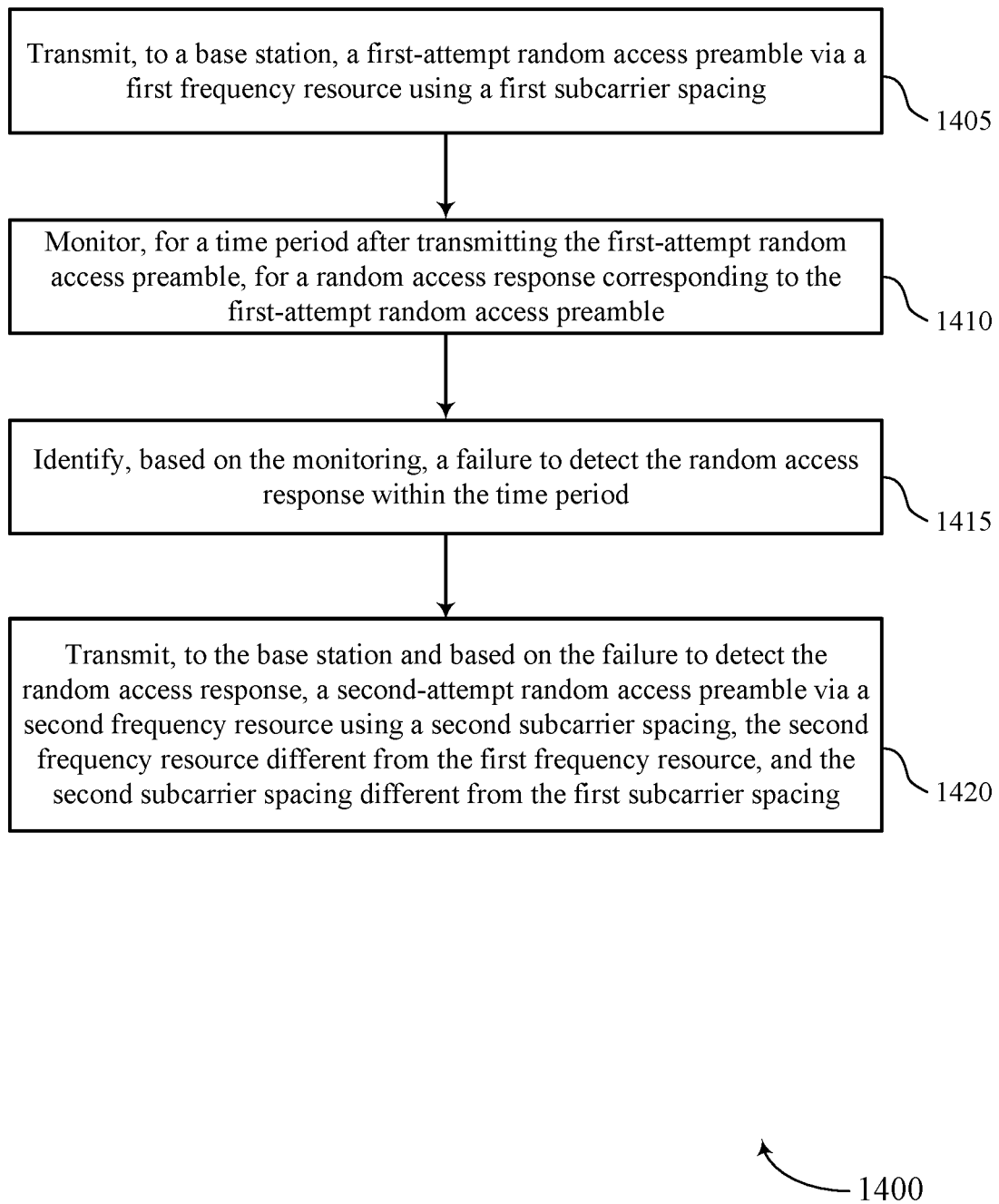

FIG. 14 shows a flowchart illustrating a method 1400 that supports random access via an alternative frequency resource in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may transmit, to a base station, a first-attempt random access preamble via a first frequency resource using a first subcarrier spacing. The first frequency resource may be within a first BWP, a first CC, a first frequency subband, or any combination thereof. The operations of 1405 may be performed according to the methods described herein. In some examples, aspects of the operations of 1405 may be performed by a random access preamble component as described with reference to FIGS. 5 through 8.

At 1410, the UE may monitor, for a time period after transmitting the first-attempt random access preamble, for a RAR corresponding to the first-attempt random access preamble. The operations of 1410 may be performed according to the methods described herein. In some examples, aspects of the operations of 1410 may be performed by a RAR component as described with reference to FIGS. 5 through 8.

At 1415, the UE may identify, based on the monitoring, a failure to detect the RAR within the time period. The operations of 1415 may be performed according to the methods described herein. In some examples, aspects of the operations of 1415 may be performed by a RAR component as described with reference to FIGS. 5 through 8.

At 1420, the UE may transmit, to the base station and based on the failure to detect the RAR, a second-attempt random access preamble. In some examples, the UE may transmit the second-attempt random access preamble via a second frequency resource within a second BWP, a second CC, a second frequency subband, or any combination thereof, and using a second subcarrier spacing, the second frequency resource different from the first frequency resource, and the second subcarrier spacing different from the first subcarrier spacing. The operations of 1420 may be performed according to the methods described herein. In some examples, aspects of the operations of 1420 may be performed by a random access preamble component as described with reference to FIGS. 5 through 8.

Figure 15:
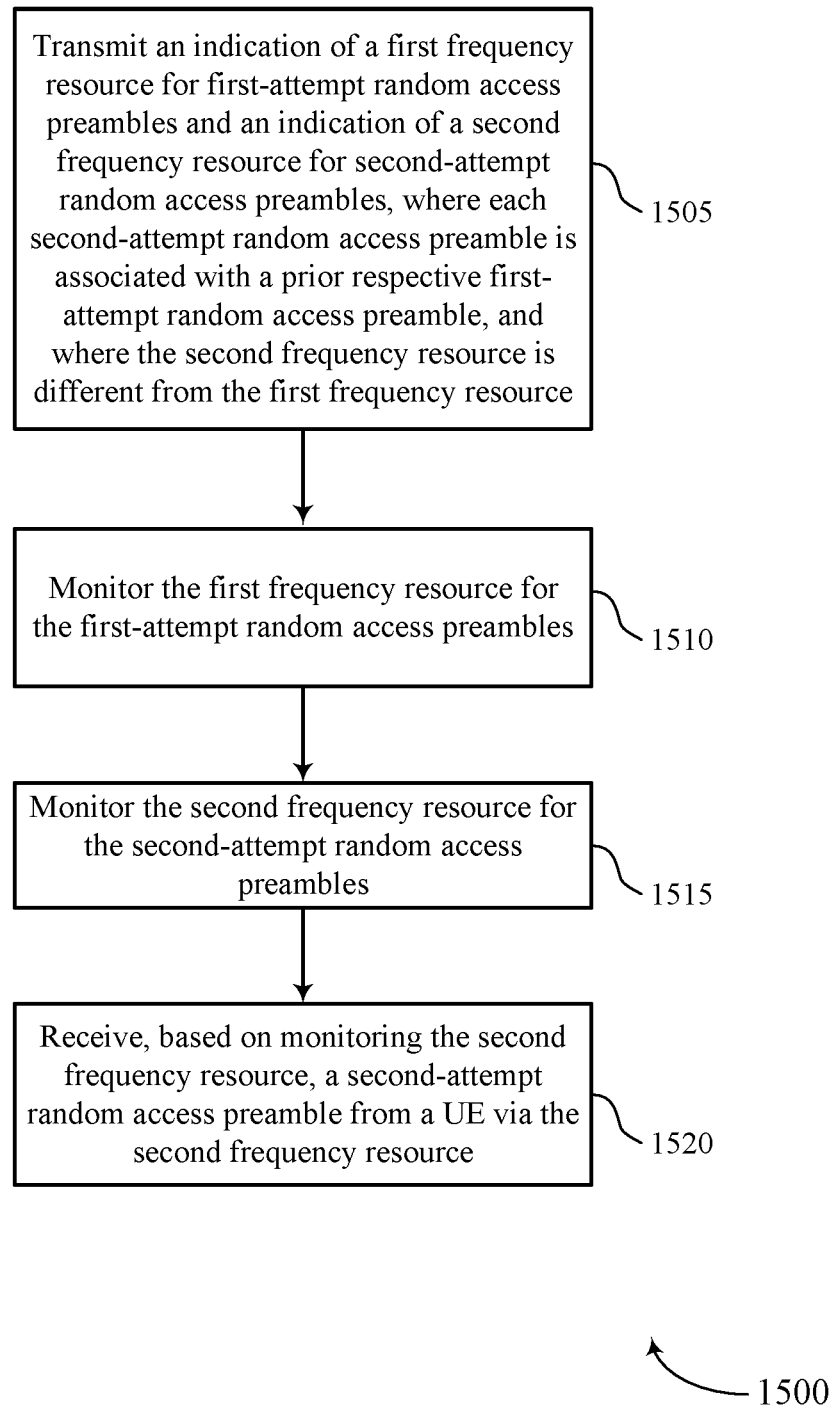

FIG. 15 shows a flowchart illustrating a method 1500 that supports random access via an alternative frequency resource in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may transmit an indication of a first frequency resource for first-attempt random access preambles and an indication of a second frequency resource for second-attempt random access preambles, where each second-attempt random access preamble is associated with a prior respective first-attempt random access preamble. The operations of 1505 may be performed according to the methods described herein. In some examples, aspects of the operations of 1505 may be performed by a random access preamble component as described with reference to FIGS. 9 through 12.

At 1510, the base station may monitor the first frequency resource for the first-attempt random access preambles. The first frequency resource may be within a first BWP, a first CC, a first frequency subband, or any combination thereof. The operations of 1510 may be performed according to the methods described herein. In some examples, aspects of the operations of 1510 may be performed by a random access preamble component as described with reference to FIGS. 9 through 12.

At 1515, the base station may monitor the second frequency resource for the second-attempt random access preambles. The second frequency resource may be within a second BWP, a second CC, a second frequency subband, or any combination thereof. The operations of 1515 may be performed according to the methods described herein. In some examples, aspects of the operations of 1515 may be performed by a frequency component as described with reference to FIGS. 9 through 12.

At 1520, the base station may receive, based on monitoring the second frequency resource, a second-attempt random access preamble from a UE. In some cases, the base station may receive the second-attempt random access preamble via the second frequency resource. The operations of 1520 may be performed according to the methods described herein. In some examples, aspects of the operations of 1520 may be performed by a random access preamble component as described with reference to FIGS. 9 through 12.

Figure 16:
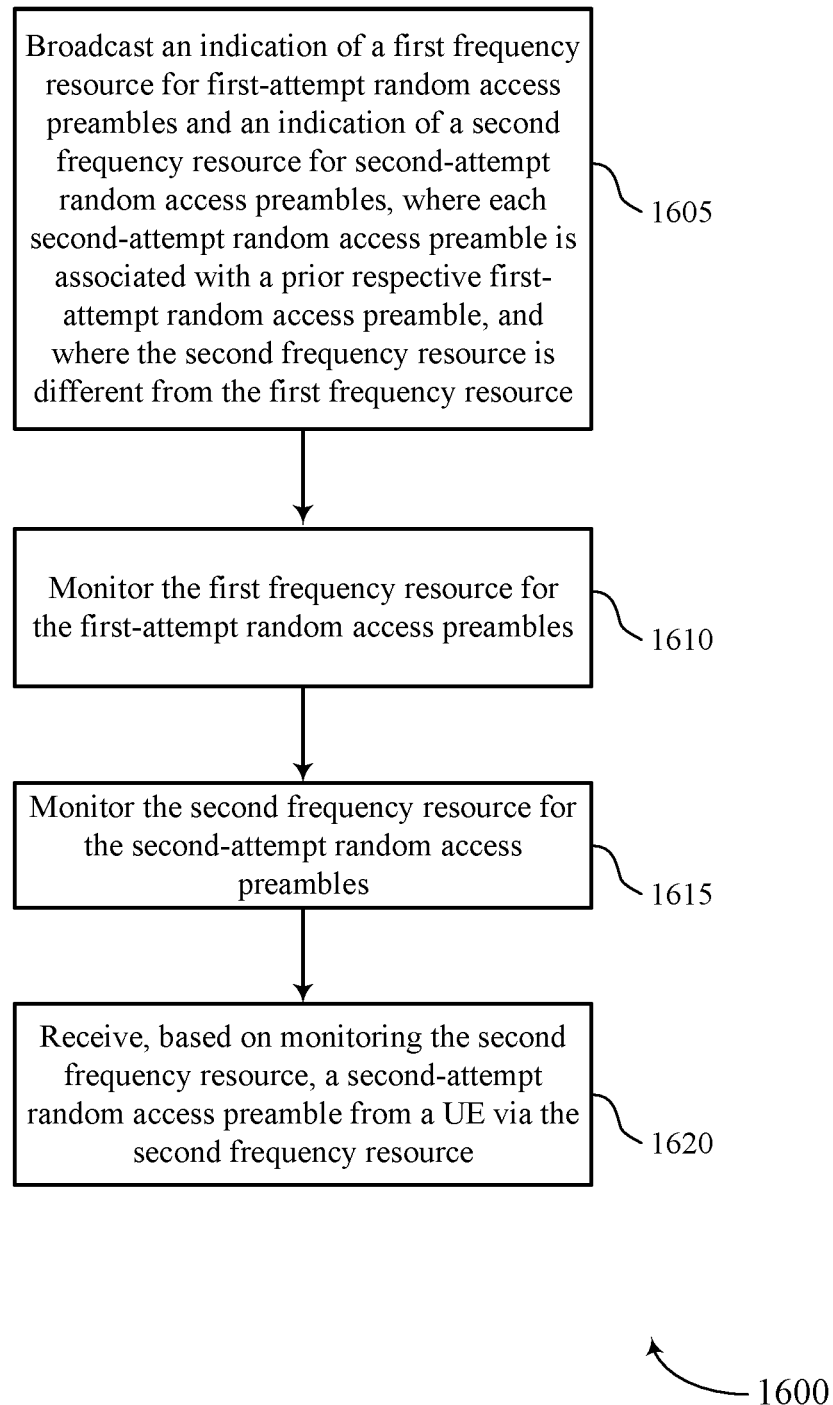

FIG. 16 shows a flowchart illustrating a method 1600 that supports random access via an alternative frequency resource in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may broadcast an indication of a first frequency resource for first-attempt random access preambles and an indication of a second frequency resource for second-attempt random access preambles, where each second-attempt random access preamble is associated with a prior respective first-attempt random access preamble. The operations of 1605 may be performed according to the methods described herein. In some examples, aspects of the operations of 1605 may be performed by a random access preamble component as described with reference to FIGS. 9 through 12.

At 1610, the base station may monitor the first frequency resource for the first-attempt random access preambles. The first frequency resource may be within a first BWP, a first CC, a first frequency subband, or any combination thereof. The operations of 1610 may be performed according to the methods described herein. In some examples, aspects of the operations of 1610 may be performed by a random access preamble component as described with reference to FIGS. 9 through 12.

At 1615, the base station may monitor the second frequency resource for the second-attempt random access preambles. The second frequency resource may be within a second BWP, a second CC, a second frequency subband, or any combination thereof. The operations of 1615 may be performed according to the methods described herein. In some examples, aspects of the operations of 1615 may be performed by a frequency component as described with reference to FIGS. 9 through 12.

At 1620, the base station may receive, based on monitoring the second frequency resource, a second-attempt random access preamble from a UE. In some cases, the base station may receive the second-attempt random access preamble via the second frequency resource. The operations of 1620 may be performed according to the methods described herein. In some examples, aspects of the operations of 1620 may be performed by a random access preamble component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: transmitting, to a base station, a first-attempt random access preamble via a first frequency resource; monitoring, for a time period after transmitting the first-attempt random access preamble, for a random access response corresponding to the first-attempt random access preamble; identifying, based at least in part on the monitoring, a failure to detect the random access response within the time period; and transmitting, to the base station and based at least in part on the failure to detect the random access response, a second-attempt random access preamble via a second frequency resource different from the first frequency resource.

Aspect 2: The method of aspect 1, wherein the first frequency resource is within a first bandwidth part, a first component carrier, a first frequency subband, or any combination thereof; and the second frequency resource is within a second bandwidth part different from the first bandwidth part, a second component carrier different from the second component carrier, a second frequency subband different from the first component carrier, or any combination thereof.

Aspect 3: The method of any of aspects 1 through 2, wherein transmitting the first-attempt random access preamble via the first frequency resource comprises transmitting the first-attempt random access preamble using a first subcarrier spacing; and transmitting the second-attempt random access preamble via the second frequency resource comprises transmitting the second-attempt random access preamble using a second subcarrier spacing that is different from the first subcarrier spacing.

Aspect 4: The method of aspect 3, wherein the second subcarrier spacing is smaller than the first subcarrier spacing.

Aspect 5: The method of aspect 4, wherein transmitting the first-attempt random access preamble via the first frequency resource comprises transmitting the first-attempt random access preamble using a first symbol duration; and transmitting the second-attempt random access preamble via the second frequency resource comprises transmitting the second-attempt random access preamble using a second symbol duration that is longer than the first symbol duration.

Aspect 6: The method of any of aspects 3 through 5, wherein transmitting the first-attempt random access preamble via the first frequency resource comprises transmitting the first-attempt random access preamble according to a first preamble format; and transmitting the second-attempt random access preamble via the second frequency resource comprises transmitting the second-attempt random access preamble according to a second preamble format that is different than the first preamble format.

Aspect 7: The method of any of aspects 1 through 6, wherein transmitting the first-attempt random access preamble via the first frequency resource comprises transmitting the first-attempt random access preamble according to a first preamble format; and transmitting the second-attempt random access preamble via the second frequency resource comprises transmitting the second-attempt random access preamble according to a second preamble format that is different than the first preamble format.

Aspect 8: The method of any of aspects 1 through 7, wherein transmitting the first-attempt random access preamble via the first frequency resource comprises transmitting the first-attempt random access preamble according to a preamble format; and transmitting the second-attempt random access preamble via the second frequency resource comprises transmitting the second-attempt random access preamble according to the preamble format.

Aspect 9: The method of any of aspects 1 through 8, further comprising: monitoring, for a second time period after transmitting the second-attempt random access preamble, for a second random access response corresponding to the second-attempt random access preamble.

Aspect 10: The method of aspect 9, wherein monitoring for the second random access response comprises monitoring the first frequency resource.

Aspect 11: The method of any of aspects 9 through 10, wherein monitoring for the second random access response comprises monitoring the second frequency resource.

Aspect 12: The method of any of aspects 9 through 11, further comprising: receiving, from the base station, an indication of a frequency resource to monitor for the second random access response, wherein monitoring for the second random access response is based at least in part on the indication.

Aspect 13: The method of any of aspects 1 through 12, further comprising: receiving, from the base station, an indication of the first frequency resource and an indication of the second frequency resource.

Aspect 14: The method of aspect 13, wherein receiving the indication of the second frequency resource comprises: receiving system information that includes the indication of the second frequency resource.

Aspect 15: The method of aspect 14, wherein the system information comprises remaining minimum system information (RMSI) that includes the indication of the second frequency resource.

Aspect 16: The method of any of aspects 1 through 15, further comprising: receiving, from the base station, a synchronization signal prior to transmitting the first-attempt random access preamble; performing one or more signal quality measurements on the synchronization signal; and determining that the one or more signal quality measurements satisfy a threshold, wherein transmitting the second-attempt random access preamble via the second frequency resource is based at least in part on determining that the one or more signal quality measurements satisfy the threshold.

Aspect 17: The method of aspect 16, wherein receiving the synchronization signal comprises receiving a synchronization signal block (SSB) that includes the synchronization signal; the one or more signal quality measurements comprise a reference signal received power for the synchronization signal; and determining that the one or more signal quality measurements satisfy the threshold comprises determining that the reference signal received power is below the threshold.

Aspect 18: A method for wireless communications at a base station, comprising: transmitting an indication of a first frequency resource for first-attempt random access preambles and an indication of a second frequency resource for second-attempt random access preambles, the second frequency resource different from the first frequency resource, wherein each second-attempt random access preamble is associated with a prior respective first-attempt random access preamble; monitoring the first frequency resource for the first-attempt random access preambles; monitoring the second frequency resource for the second-attempt random access preambles; and receiving, based at least in part on monitoring the second frequency resource, a second-attempt random access preamble from a UE via the second frequency resource.

Aspect 19: The method of aspect 18, wherein the first frequency resource is within a first bandwidth part, a first component carrier, a first frequency subband, or any combination thereof; and the second frequency resource is within a second bandwidth part different from the first bandwidth part, a second component carrier different from the second component carrier, a second frequency subband different from the first component carrier, or any combination thereof.

Aspect 20: The method of any of aspects 18 through 19, wherein transmitting the indication of the first frequency resource and the indication of the second frequency resource comprises: broadcasting the indication of the first frequency resource and the indication of the second frequency resource.

Aspect 21: The method of any of aspects 18 through 20, wherein transmitting the indication of the first frequency resource and the indication of the second frequency resource comprises: transmitting system information for a cell associated with the base station, the system information including the indication of the first frequency resource and the indication of the second frequency resource.

Aspect 22: The method of any of aspects 18 through 21, wherein the first frequency resource has a first subcarrier spacing; and the second frequency resource has a second subcarrier spacing that is different from the first subcarrier spacing.

Aspect 23: The method of aspect 22, wherein the second subcarrier spacing is smaller than the first subcarrier spacing.

Aspect 24: The method of any of aspects 18 through 23, wherein each of the second-attempt random access preambles has a different preamble format than a respective first-attempt random access preamble.

Aspect 25: The method of any of aspects 18 through 24, wherein each of the second-attempt random access preambles has a same preamble format as a respective first-attempt random access preamble.

Aspect 26: The method of any of aspects 18 through 25, further comprising: transmitting, to the UE in response to the second-attempt random access preambles, a random access response via the first frequency resource.

Aspect 27: The method of any of aspects 18 through 26, further comprising: transmitting, to the UE in response to the second-attempt random access preambles, a random access response via the second frequency resource.

Aspect 28: The method of any of aspects 18 through 27, further comprising: transmitting a synchronization signal, wherein: the second frequency resource is for the second-attempt random access preambles from one or more UEs when, for the one or more UEs, a signal quality of the synchronization signal is below a signal quality threshold; and the first frequency resource is for the second-attempt random access preambles from the one or more UEs when, for the one or more UEs, the signal quality of the synchronization signal satisfies the signal quality threshold.

Aspect 29: An apparatus for wireless communications at a UE, comprising a processor; memory coupled with the processor; and instructions stored in the memory and executable by the processor to cause the apparatus to perform a method of any of aspects 1 through 17.

Aspect 30: An apparatus for wireless communications at a UE, comprising at least one means for performing a method of any of aspects 1 through 17.

Aspect 31: A non-transitory computer-readable medium storing code for wireless communications at a UE, the code comprising instructions executable by a processor to perform a method of any of aspects 1 through 17.

Aspect 32: An apparatus for wireless communications at a base station, comprising a processor; memory coupled with the processor; and instructions stored in the memory and executable by the processor to cause the apparatus to perform a method of any of aspects 18 through 28.

Aspect 33: An apparatus for wireless communications at a base station, comprising at least one means for performing a method of any of aspects 18 through 28.

Aspect 34: A non-transitory computer-readable medium storing code for wireless communications at a base station, the code comprising instructions executable by a processor to perform a method of any of aspects 18 through 28.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving a synchronization signal associated with one or more signal quality measurements;
   receiving an indication of a first frequency resource, an indication of a second frequency resource, and an indication of whether the UE is to monitor the first frequency resource or monitor the second frequency resource for a second random access response corresponding to a second-attempt random access preamble;
   transmitting a first-attempt random access preamble via the first frequency resource;
   monitoring, for a time period after transmitting the first-attempt random access preamble, the first frequency resource for a random access response corresponding to the first-attempt random access preamble;
   transmitting, after failing to detect the random access response within the time period, the second-attempt random access preamble via the second frequency resource different from the first frequency resource in accordance with the one or more signal quality measurements satisfying a threshold, the second frequency resource being for the second-attempt random access preamble when the one or more signal quality measurements satisfy the threshold, and the first frequency resource being for the second-attempt random access preamble when the one or more signal quality measurements fail to satisfy the threshold; and
   monitoring, for a second time period after transmitting the second-attempt random access preamble and in accordance with the indication, the first frequency resource or the second frequency resource for the second random access response corresponding to the second-attempt random access preamble.

2. The method of claim 1, wherein:
   the first frequency resource is within a first bandwidth part, a first component carrier, a first frequency subband, or any combination thereof; and
   the second frequency resource is within a second bandwidth part different from the first bandwidth part, a second component carrier different from the second component carrier, a second frequency subband different from the first component carrier, or any combination thereof.

3. The method of claim 1, wherein:
   the transmitting of the first-attempt random access preamble via the first frequency resource comprises transmitting the first-attempt random access preamble using a first subcarrier spacing; and
   the transmitting of the second-attempt random access preamble via the second frequency resource comprises transmitting the second-attempt random access preamble using a second subcarrier spacing that is different from the first subcarrier spacing.

4. The method of claim 3, wherein the second subcarrier spacing is smaller than the first subcarrier spacing.

5. The method of claim 4, wherein:
   the transmitting of the first-attempt random access preamble via the first frequency resource comprises transmitting the first-attempt random access preamble using a first symbol duration; and
   the transmitting of the second-attempt random access preamble via the second frequency resource comprises transmitting the second-attempt random access preamble using a second symbol duration that is longer than the first symbol duration.

6. The method of claim 3, wherein:
   the transmitting of the first-attempt random access preamble via the first frequency resource comprises transmitting the first-attempt random access preamble according to a first preamble format; and
   the transmitting of the second-attempt random access preamble via the second frequency resource comprises transmitting the second-attempt random access preamble according to a second preamble format that is different than the first preamble format.

7. The method of claim 1, wherein:
   the transmitting of the first-attempt random access preamble via the first frequency resource comprises transmitting the first-attempt random access preamble according to a first preamble format; and
   the transmitting of the second-attempt random access preamble via the second frequency resource comprises transmitting the second-attempt random access preamble according to a second preamble format that is different than the first preamble format.

8. The method of claim 1, wherein:
   the transmitting of the first-attempt random access preamble via the first frequency resource comprises transmitting the first-attempt random access preamble according to a preamble format; and the transmitting of the second-attempt random access preamble via the second frequency resource comprises transmitting the second-attempt random access preamble according to the preamble format.

9. The method of claim 1, wherein the monitoring for the second random access response comprises monitoring the first frequency resource.

10. The method of claim 1, wherein the monitoring for the second random access response comprises monitoring the second frequency resource.

11. The method of claim 1, wherein the receiving of the indication of the second frequency resource comprises:
receiving system information that includes the indication of the second frequency resource.

12. The method of claim 11, wherein the system information comprises remaining minimum system information (RMSI) that includes the indication of the second frequency resource.

13. The method of claim 1, wherein:
the receiving of the synchronization signal comprises receiving a synchronization signal block (SSB) that includes the synchronization signal;
the one or more signal quality measurements comprise a reference signal received power for the synchronization signal; and
the one or more signal quality measurements satisfying the threshold comprises the reference signal received power being below the threshold.

14. A method for wireless communications at a network device, comprising:
transmitting a synchronization signal;
transmitting an indication of a first frequency resource for first-attempt random access preambles, an indication of a second frequency resource for second-attempt random access preambles, and an indication of whether a user equipment (UE) is to monitor the first frequency resource or monitor the second frequency resource for a second random access response corresponding to the second-attempt random access preambles, the second frequency resource different from the first frequency resource, each second-attempt random access preamble being associated with a prior respective first-attempt random access preamble, the second frequency resource being for the second-attempt random access preambles when a signal quality associated with the synchronization signal satisfies a signal quality threshold, and the first frequency resource being for the second-attempt random access preambles when the signal quality associated with the synchronization signal fails to satisfy the signal quality threshold;
monitoring the first frequency resource for the first-attempt random access preambles after transmitting the synchronization signal;
monitoring the second frequency resource for the second-attempt random access preambles after transmitting the synchronization signal;
receiving, in accordance with monitoring the second frequency resource, a second-attempt random access preamble from the UE via the second frequency resource; and
transmitting, in accordance with the indication of whether the UE is to monitor the first frequency resource or monitor the second frequency resource, the second random access response corresponding to the second-attempt random access preamble.

15. The method of claim 14, wherein:
the first frequency resource is within a first bandwidth part, a first component carrier, a first frequency subband, or any combination thereof; and
the second frequency resource is within a second bandwidth part different from the first bandwidth part, a second component carrier different from the second component carrier, a second frequency subband different from the first component carrier, or any combination thereof.

16. The method of claim 14, wherein the transmitting of the indication of the first frequency resource and the indication of the second frequency resource comprises:
broadcasting the indication of the first frequency resource and the indication of the second frequency resource.

17. The method of claim 14, wherein the transmitting of the indication of the first frequency resource and the indication of the second frequency resource comprises:
transmitting system information for a cell associated with the network device, the system information including the indication of the first frequency resource and the indication of the second frequency resource.

18. The method of claim 14, wherein:
the first frequency resource has a first subcarrier spacing; and
the second frequency resource has a second subcarrier spacing that is different from the first subcarrier spacing.

19. The method of claim 18, wherein the second subcarrier spacing is smaller than the first subcarrier spacing.

20. The method of claim 14, wherein each of the second-attempt random access preambles has a different preamble format than a respective first-attempt random access preamble.

21. The method of claim 14, wherein each of the second-attempt random access preambles has a same preamble format as a respective first-attempt random access preamble.

22. The method of claim 14, further comprising:
transmitting, to the UE in response to the second-attempt random access preambles, the second random access response via the first frequency resource.

23. The method of claim 14, further comprising:
transmitting, to the UE in response to the second-attempt random access preambles, the second random access response via the second frequency resource.

24. The method of claim 14, wherein:
the second frequency resource is for the second-attempt random access preambles when the signal quality associated with the synchronization signal is below the signal quality threshold; and
the first frequency resource is for the second-attempt random access preambles when the signal quality associated with the synchronization signal is not below the signal quality threshold.

25. An apparatus for wireless communications at a user equipment (UE), comprising:
a processing system that includes one or more processors and one or more memories coupled with the one or more processors, the processing system configured to cause the apparatus to:
receive a synchronization signal associated with one or more signal quality measurements;
receive an indication of a first frequency resource, an indication of a second frequency resource, and an indication of whether the UE is to monitor the first frequency resource or monitor the second frequency resource for a second random access response corresponding to a second-attempt random access preamble;
transmit a first-attempt random access preamble via the first frequency resource;
monitor, for a time period after transmitting the first-attempt random access preamble, the first frequency resource for a random access response corresponding to the first-attempt random access preamble;
transmit, after failing to detect the random access response within the time period, the second-attempt random access preamble via the second frequency resource different from the first frequency resource in accordance with the one or more signal quality measurements satisfying a threshold, the second frequency resource being for the second-attempt random access preamble when the one or more signal quality measurements satisfy the threshold, and the first frequency resource being for the second-attempt random access preamble when the one or more signal quality measurements fail to satisfy the threshold; and
monitor, for a second time period after transmitting the second-attempt random access preamble and in accordance with the indication, the first frequency resource or the second frequency resource for the second random access response corresponding to the second-attempt random access preamble.

26. An apparatus for wireless communications at a network device, comprising:
a processing system that includes one or more processors and one or more memories coupled with the one or more processors, the processing system configured to cause the apparatus to:
transmit a synchronization signal;
transmit an indication of a first frequency resource for first-attempt random access preambles, an indication of a second frequency resource for second-attempt random access preambles, and an indication of whether a user equipment (UE) is to monitor the first frequency resource or monitor the second frequency resource for a second random access response corresponding to the second-attempt random access preambles, the second frequency resource different from the first frequency resource, each second-attempt random access preamble being associated with a prior respective first-attempt random access preamble, the second frequency resource being for the second-attempt random access preambles when a signal quality associated with the synchronization signal satisfies a signal quality threshold, and the first frequency resource being for the second-attempt random access preambles when the signal quality associated with the synchronization signal fails to satisfy the signal quality threshold;
monitor the first frequency resource for the first-attempt random access preambles after transmitting the synchronization signal;
monitor the second frequency resource for the second-attempt random access preambles after transmitting the synchronization signal;
receive, in accordance with monitoring the second frequency resource, a second-attempt random access preamble from the UE via the second frequency resource; and
transmit, in accordance with the indication of whether the UE is to monitor the first frequency resource or monitor the second frequency resource, the second random access response corresponding to the second-attempt random access preamble.

* * * * *